United States Patent
Goulkhah et al.

(10) Patent No.: US 10,331,813 B2
(45) Date of Patent: Jun. 25, 2019

(54) CLOSED LOOP SIMULATION OF A COMPUTER MODEL OF A PHYSICAL SYSTEM AND AN ACTUAL REAL-TIME HARDWARE COMPONENT OF THE PHYSICAL SYSTEM

(71) Applicant: UNIVERSITY OF MANITOBA, Winnipeg, Manitoba (CA)

(72) Inventors: Mohammad Goulkhah, Winnipeg (CA); Aniruddha Madhukar Gole, Winnipeg (CA)

(73) Assignee: THE UNIVERSITY OF MANITOBA, Winnipeg, Manitoba (CA)

( * ) Notice: Subject to any disclaimer, the term of this patent is extended or adjusted under 35 U.S.C. 154(b) by 587 days.

(21) Appl. No.: 14/899,915

(22) PCT Filed: Feb. 10, 2014

(86) PCT No.: PCT/CA2014/050089
§ 371 (c)(1),
(2) Date: Dec. 18, 2015

(87) PCT Pub. No.: WO2014/201552
PCT Pub. Date: Dec. 24, 2014

(65) Prior Publication Data
US 2016/0147920 A1 May 26, 2016

Related U.S. Application Data

(60) Provisional application No. 61/837,422, filed on Jun. 20, 2013.

(51) Int. Cl.
*G06F 17/50* (2006.01)
*G01R 31/28* (2006.01)
(Continued)

(52) U.S. Cl.
CPC ..... *G06F 17/5009* (2013.01); *G01R 31/2846* (2013.01); *G06F 11/261* (2013.01);
(Continued)

(58) Field of Classification Search
CPC ............... G06F 17/5009; G06F 11/261; G06F 2217/86; G01R 31/2846; G01R 31/06; G01R 31/343; Y02T 10/82
See application file for complete search history.

(56) References Cited

U.S. PATENT DOCUMENTS 6,801,881 B1 * 10/2004 Shah ...................... G05B 17/02
700/105
8,533,136 B1 9/2013 Xu et al.
(Continued)

OTHER PUBLICATIONS

M. Goulkhah et al, Practical Application of Waveform Relaxation Method for Testing Remote Protective Relays, 2015 IEEE, p. 1381-1386. (Year: 2015).*
(Continued)

*Primary Examiner* — Rehana Perveen
*Assistant Examiner* — Chuen-Meei Gan
(74) *Attorney, Agent, or Firm* — Thompson Hine LLP

(57) ABSTRACT

A method and system for performing closed loop simulation of a computer model of a physical system and a hardware component of the physical system is provided. An input waveform for the component from the simulated model of the physical system using an initial waveform as a response waveform of the component is generated at a simulation processor. The input waveform is sent from the simulation processor through a network to a real-time playback and record device (RTPR). The RTPR plays back the input waveform in real time to the component and receives a response waveform of the component and provides the response waveform to the simulation processor. Waveform relaxation (WR) converging methods are utilized at the
(Continued)

simulation processor to enable convergence of the generated waveforms affected by hardware induced distortions. A WR method with the generated waveforms are performed to provide a closed loop response of the component.

19 Claims, 16 Drawing Sheets

(51) Int. Cl.
    *G06F 11/26*     (2006.01)
    *G01R 31/34*     (2006.01)
    *G01R 31/06*     (2006.01)

(52) U.S. Cl.
    CPC ............ *G01R 31/06* (2013.01); *G01R 31/343* (2013.01); *G06F 2217/86* (2013.01)

(56) References Cited

U.S. PATENT DOCUMENTS

| | | | | |
|---|---|---|---|---|
| 2004/0236557 | A1* | 11/2004 | Shah | G06F 17/5036 703/14 |
| 2005/0125211 | A1 | 6/2005 | Nahata et al. | |
| 2005/0273298 | A1* | 12/2005 | Shah | G06F 17/5036 703/2 |
| 2008/0312855 | A1* | 12/2008 | Monti | G01R 31/2848 702/64 |
| 2016/0003921 | A1 | 1/2016 | Hensler et al. | |

OTHER PUBLICATIONS

Mohammad (Monty) Goulkhah, Waveform Relaxation Based Hardware-in-the-Loop Simulation Thesis, Department of Electrical and Computer Engineering, University of Manitoba, 2015 (Year: 2015).*

A M Kulkarni, K Salunkhe and M C Chandorkar, S P Panda and N Sankaranarayanan, Waveform-Relaxation Based Iterative Real-Time Playback Schemes for Testing of Wide Area Power System Controllers, 2010 IEEE, p. 1-8. (Year: 2010).*

Sourajeet Roy and Anestis Dounavis, Waveform Relaxation based Analysis of Noise Propagation in Power Distribution Networks, 2011 IEEE, p. 255-258. (Year: 2011).*

Lawrence Abrams, IP Address Exaplined. https://www.bleepingcomputer.com/tutorials/ip-addresses-explained/ (Year: 2004).*

PCT, International Search Report and Written Opinion, International Application No. PCT/CA2014/050089, dated May 23, 2014.

* cited by examiner

CLOSED LOOP SIMULATION OF A COMPUTER MODEL OF A PHYSICAL SYSTEM AND AN ACTUAL REAL-TIME HARDWARE COMPONENT OF THE PHYSICAL SYSTEM

CROSS-REFERENCE TO RELATED APPLICATIONS

This application is a National Stage filing of International Application No. PCT/CA2014/050089 filed Feb. 10, 2014, which claims priority from U.S. Provisional Patent Application No. 61/837,422 filed Jun. 20, 2013 the entireties of which are hereby incorporated by reference.

TECHNICAL FIELD

The disclosure relates to a system and method for closed loop simulation of a computer model simulation and an actual real-time hardware component of a physical system using waveform relaxation.

BACKGROUND

Real-time Hardware-in-the-Loop (HIL) Simulation is a tool to test and/or optimize a piece of hardware, for example a controller, within a simulated system. HIL simulation is applicable in many industries such as aerospace, automotive, maritime, offshore, robotics and electronics and power systems during development, testing and troubleshooting systems where the physical system can be expensive and simulation systems can be utilized in place of the physical system. Typical real-time digital simulation employ simulation hardware using very fast processors in order to perform the simulated systems in real-time suitable for the hardware in the loop simulation. The processors required for existing technologies present the major expense of the device. HIL simulation is faster and safer from an equipment safety point of view than connecting the hardware into the real physical system. Moreover, this technique is useful in validating implementation of designed controllers in embedded systems. However, the degree of complexity and the size of the simulated system may need to be limited to assure the real-time simulation of a model, otherwise, multiple real-time simulator devices are required in order to split the large systems into smaller subsystems simulated in real-time, which implies more costs to provide the simulation.

Systems such as modern power systems can cover large geographic areas and are an example of an industry where HIL simulation can be of significant benefit in deployment, testing and maintenance. The large size of the simulated power networks models coupled with the need for small simulation time-steps imposes significant challenges for performing real-time simulations as it requires very fast parallel processing computers. In real-time digital simulation the simulation software and the real-world hardware must exchange data in every time step, this requires sophisticated and nontrivial interface design between the real and simulated worlds. When real-time digital simulator is interfaced to external hardware, the interface can often result in an inaccurate simulation and even instability due to issues such as amplifier bandwidth and delays. There is no unique interface algorithm that provides the best stable and accurate results for every simulated system, therefore, depending on the system to be simulated, an appropriate interface algorithm must be selected. As a consequence, HIL simulation with real-time digital simulation is infeasible where the hardware under test is geographically remote from the real-time simulator, such as in another city or even another country. In addition, although advances in development of fast processors such as digital signal processing (DSP) and FPGA technologies has helped address the challenges of simulating large power systems significant hardware and software expenses are incurred.

Waveform Relaxation (WR) based HIL simulation is considerably cost effective compared to the state of the art technologies. Waveform relaxation is traditionally an iterative method of solving systems of ordinary nonlinear differential equations. WR based HIL simulation can also be used for the iterative simulation of systems, for a large system, the system can be divided into two or more different subsystems and each be simulated independent of the other(s). The results are exchanged when simulations end, and the simulations are repeated. If certain convergence criteria are met, after enough number of iterations, the simulation results show no more changes, and can be said to have converged.

A significant drawback of the WR based HIL simulation is the possible slow convergence of the simulation. The WR convergence speed highly depends on the tightness between the subsystems. If the hardware-under-test is loosely connected to the simulation, then only a few iterations are required to reach convergence. Another disadvantage of the WR based HIL simulation is the limited total simulation time. Available real-time HIL simulators exchange the data points at every simulation time step placing considerable processor and memory demands. However, there is usually no need for a long simulation period if the transient response of the HUT is of interest. Another shortcoming of the WR based HIL simulation is that it is inherently an off-line simulation, for example once a step change is applied to the simulated system or to the parameters of the hardware, the results cannot be immediately followed. Instead, the WR should be allowed to converge in a course of iterations. The main question regarding the WR based HIL simulation is whether the simulation convergences for a specific system. The tight connection of the subsystems can slow down the convergence speed and the simulation may sometimes not converge. In addition, the WR simulation can encounter instabilities when applied to the HIL simulation with the presence of noise and analog-digital converters inaccuracies even for theoretical stable regions of simulation. The instabilities can occur when the simulation and hardware subsystems are connected fairly tight and can impact the accuracy and speed of the simulation.

Accordingly, systems and methods that enable improved hardware-in-loop (HIL) simulations remain highly desirable.

BRIEF DESCRIPTION OF THE DRAWINGS

The system and method for closed loop simulation of a computer model of a physical system and an actual real-time hardware component of the physical system may be better understood with reference to the following drawings and description. The components in the figures are not necessarily to scale, emphasis instead being placed upon illustrating the principles of the disclosure. Moreover, in the figures, like referenced numerals designate corresponding parts throughout the figures.

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
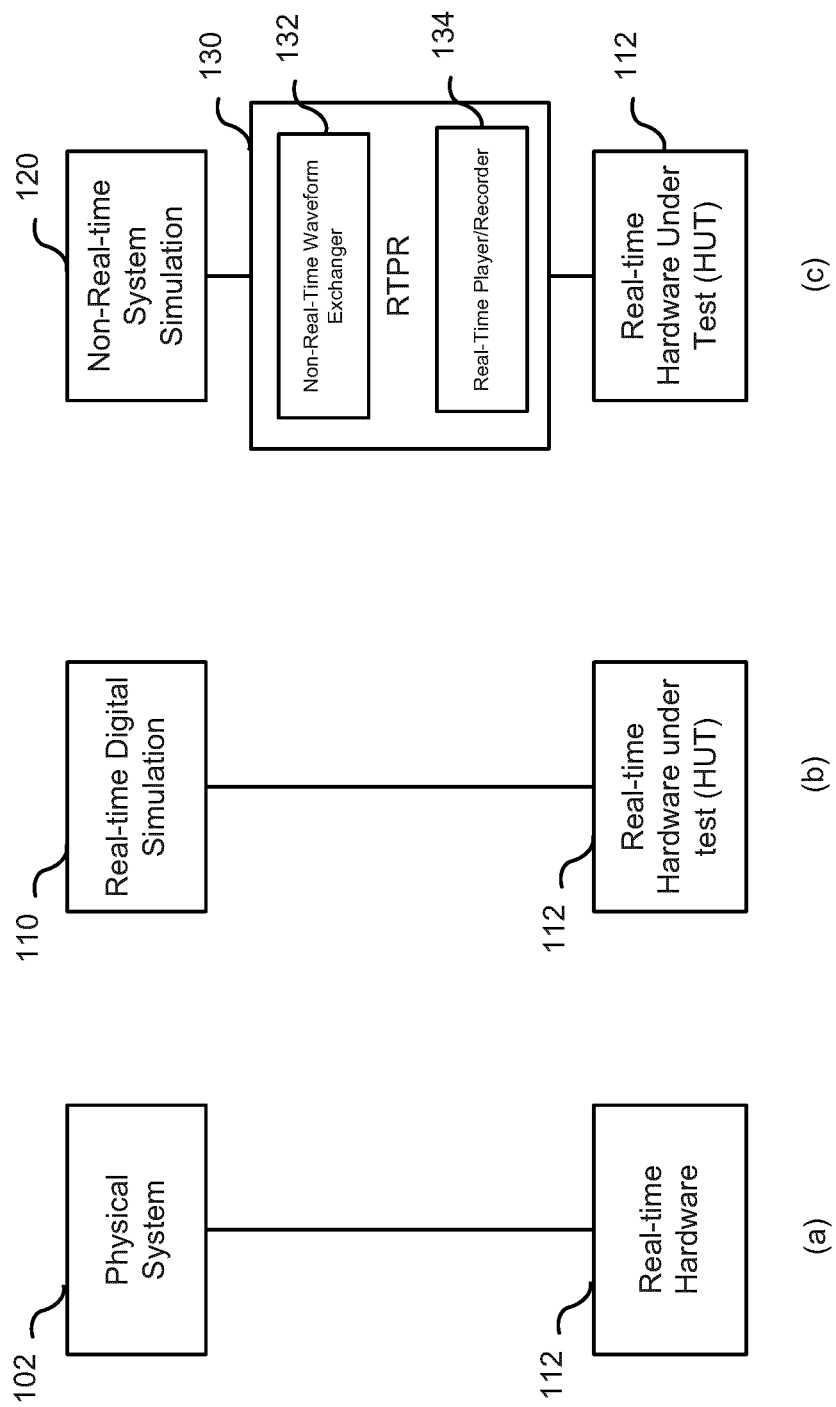
FIGS. 1a-c show a representation of hardware test schemes.

Embodiments are described below, by way of example only, with reference to FIGS. 1-16.

In accordance with an aspect of the present disclosure there is provided a method of closed loop simulation of a computer model of a physical system and an actual real-time hardware component of the physical system. The method comprising: generating at a simulation processor an input waveform for the component from a simulated model of the physical system using an initial waveform as a response waveform of the component; sending from the simulation processor through a network to a real-time playback and record device (RTPR) connected to the component the input waveform, the RTPR resetting the component to an initial state and playing back the input waveform in real-time to the component, the RTPR receiving a real-time response waveform generated from the component; receiving at the simulation processor from the RTPR through the network the generated response waveform of the component; using one or more waveform relaxation (WR) converging methods at the simulation processor to enable convergence of the generated waveforms affected by hardware induced distortions; and performing a WR method with the generated waveforms to provide the closed loop simulation response.

In accordance with another aspect of the present disclosure there is provided a non-transitory computer readable memory for performing closed loop simulation of a computer model of a physical system and an actual real-time hardware component of the physical system, the memory containing instructions which when executed by a processor perform. The method comprising: generating at a simulation processor an input waveform for the component from a simulated model of the physical system using an initial waveform as a response waveform of the component; sending from the simulation processor through a network to a real-time playback and record device (RTPR) connected to the component the input waveform, the RTPR resetting the component to an initial state and playing back the input waveform in real-time to the component, the RTPR receiving a real-time response waveform generated from the component; receiving at the simulation processor from the RTPR through the network the generated response waveform of the component; using one or more waveform relaxation (WR) converging methods at the simulation processor to enable convergence of the generated waveforms affected by hardware induced distortions; and performing a WR method with the generated waveforms to provide the closed loop simulation response.

In accordance with yet another aspect of the present disclosure there is provided a system for performing closed loop simulation. The system comprising: a real-time playback and recording (RTPR) device coupled to a component and a communication network, the RTPR for playing back input waveforms in real-time for the component, the RTPR receiving real-time response waveforms generated from the component; a system simulation client computer coupled to a communication network, the system simulation client computer having a simulator program to simulate a computer model of a physical system, the system simulation client computer playing back input waveforms to the model of the physical system, and recording the response of the simulation of the model of the physical system; and a server computer coupled to the communication networks for communicating with the RTPR and the system simulation client computer, the server computer equipped with a waveform relaxation algorithm and converging methods, the server computer configured to: receive a simulation configuration from the system simulation client computer having IP addresses associated with the RTPR and the system simulation client computer; perform closed loop simulation of the component coupled to the RTPR and the model of the physical system simulated in the system simulation client computer by exchanging the waveforms by communicating with the RTPR and the system simulation client computer via the associated IP addresses; and provide a response of the closed loop simulation to the system simulation client computer via the associated IP address.

In accordance with still yet another aspect of the present disclosure there is provided a method for determining a fault in a component. The method comprising: determining at a simulation processor an input waveform for the component; sending from the simulation processor through a network to a real-time playback and record device (RTPR) connected to the component the input waveform, the RTPR resetting the component to an initial state and playing back the input waveform in real-time for the component, the RTPR receiving a real-time response waveform generated from the component; receiving at the simulation processor from the RTPR through the network the generated response waveform of the component; comparing at the simulation processor the received response waveform of the component to an expected response waveform of component; determining if the component is faulty based upon the comparison of the received response waveform and the expected response waveform of the component.

In accordance with still yet another aspect of the present disclosure there is provided a server coupled to a communication network, the server for performing closed loop simulation. The server comprising: a processor; and a memory coupled to the processor, containing instructions which when executed by the processor perform: receiving a simulation configuration from a system simulation client computer coupled to the communication network, the system simulation client computer having a simulator program to simulate a computer model of a physical system, the system simulation client computer playing back input waveforms to the model of the physical system, and recording the response of the simulation of the model of the physical system, the simulation configuration having IP addresses associated with a real-time playback and recording (RTPR) device coupled to a component and a communication network, the RTPR for playing back input waveforms in real-time for the component, the RTPR receiving real-time response waveforms generated from the component; performing closed loop simulation of the component coupled to the RTPR and the model of the physical system simulated in the system simulation client computer by exchanging the waveforms by communicating with the RTPR and the system simulation client computer via the associated IP addresses; and providing a response of the closed loop simulation to the system simulation client computer via the associated IP address.

In accordance with still yet another aspect of the present disclosure there is provided a system for performing closed loop simulation The system comprising: a first system simulation client computer coupled to a communication network, the first system simulation client computer having a simulator program to simulate a first computer model of a first physical system; a second system simulation client computer coupled to a communication network, the second system simulation client computer having a simulator program to simulate a second computer model of a second physical system; a server computer coupled to the communication networks and the first and second system simulation client computers, the server computer equipped with a waveform relaxation algorithm and converging methods, the server computer configured to: receive a simulation configuration from the first and second system simulation client computers; perform closed loop simulation of the first and second physical systems simulated in the first and second system simulation client computers by exchanging simulation waveforms between the first and second system simulation client computers; and provide a response of the closed loop simulation to the first and second system simulation client computers.

In accordance with still yet another aspect of the present disclosure there is provided a method of testing multiple hardware component of same type. The method comprising: for each of the plurality of hardware components of the same type: associating a real-time playback and recording (RTPR) device coupled to a communication network with one of a plurality of hardware components; determining a subset of hardware parameters associated with the associated one of the plurality of hardware components; sending the subset of hardware parameters to the RTPR to be applied to the one of the plurality of hardware components; determining a subset of input waveforms associated with the one of the plurality of hardware components, the input waveforms generated from simulation of a model of a physical system; sending the subset of input waveforms to the RTPR to be applied to the one of the plurality of hardware components and obtaining the hardware response waveform; wherein the associating of the RTPR with one of the plurality of hardware components is performed iteratively for each of the plurality of hardware components in succession until all of the respective hardware parameters have been applied to the plurality of hardware components; performing closed loop simulation of the plurality of hardware components of same type and a simulated model of a physical system associated with the plurality of hardware components Real-time hardware-in-the-loop (HIL) simulation is a technique to integrate actual real-time hardware within simulations of a system. The system being simulated can take many forms and be related to industries such as but not limited to aerospace, automotive, maritime, offshore, robotics and electronics and power systems. The system simulation can be useful during development, testing and troubleshooting systems where the physical system can be expensive and simulation systems can be utilized in place of the physical system. Waveform Relaxation (WR) based HIL simulation is considerably cost effective compared to the state of the art technologies. The main reason WR based HIL simulation can be considerably more cost effective is that the simulation needs not be performed in real-time since the model of the system is decoupled from the hardware-under-test (HUT) and therefore every regular personal computer (PC) processor can be used to simulate the system. The main drawback of the WR based HIL simulation is the possible slow convergence of the simulation. The WR convergence speed highly depends on the tightness between the subsystems. If the HUT is loosely connected to the simulation, then only a few iterations are required to reach the convergence. There are a number of converging methods to fast up the WR convergence which will be described.

FIG. 1(a) shows the hardware under test (HUT) 104 to be connected to a physical system 102. In order to appropriately integrate actual hardware in a simulation, the signals applied to the hardware must be in real-time to reveal the real behaviours of that component, however, computer signals are non-real-time. Currently there are some designs in which the simulation is performed in real-time and therefore the signals applied to the hardware via the interface are in real-time. As shown in FIG. 1(b) an approach where a real-time digital simulator 110 replaces the physical controller hardware and connects to the real-time hardware component under test (HUT) 112. In this case the physical system is simulated by real-time digital simulation simulator 110 using a processor to generate the simulation signals to be provided to the hardware 104.

More recently, in a particular simulation application using high power interface amplifiers, it has become possible to connect power hardware equipment to real-time digital simulator. This allows testing of multi-megawatt power equipment such as wind turbine generators, etc. to be tested as though it were connected to a real system. This type of simulation is referred to as Power-Hardware-in-the-Loop simulation (PHIL). Real-time digital simulators are expensive, and so the cost of doing HIL and PHIL simulations using real-time digital simulation is only affordable to a few.

An alternate approach to conduct the HIL simulation is shown in FIG. 1(c). In this method, a regular PC processor is used to simulate non-real-time system 120 for a predefined limited total simulation time. The communication with the HUT 112 is possible using a Real-time Player/Recorder (RTPR) 130 device which can be located remotely from the simulation system 120 and removes the need for real-time communication with the HUT 112. The RTPR 130 provides the ability to exchange a non-real-time waveform 132, or signal, with the system simulation 120 which is provided to a real-time player/recorder module 134 to provide the waveform to the HUT 112. The RTPR 130 receives waveforms back from the HUT 112 which are sent to the system simulation 120. The exchange of waveforms/signals between the simulation system 120 and the HUT 112 is iterated until the waveforms converge and the closed loop response of the two subsystems is found.

Traditionally, waveform relaxation (WR) has been a purely software based approach for decoupling and iteratively solving a set of coupled equations, Algebraic (AE), Ordinary Differential (ODE), or Differential-Algebraic (DAE). The system described utilizes modified iterative WR techniques in order to implement the real-time HIL simulation within non-real-time simulation systems. In this scheme, even inexpensive computer processors can be used in order to simulate the modeled systems. Besides the ability of the RTPR 130 to connect to the Internet along with the unique property of the WR technique, which keeps the stability of the simulation unrelated to the delay in signals communication, the RTPR 130 makes it practical to test Multiple-Hardware-in-the-Loop (MHIL) each located at geographically distant places. The WR techniques described can be implemented in simulation software, such as but not limited to Matlab™, RSCAD™, and PSCAD™, PSS/E™, PSpice™, Multisim™, and Cadence OrCAD™, etc, but may also be implemented in application specific software. Generally, the simulation tools of different software can be used at the same time to test and optimize the real controllers in the loop, e.g. optimization of a real PI (proportional-integral) controller by means of optimization tools of Matlab™ while the main system is modeled in PSCAD. Furthermore, based on the WR technique properties, different simulation time steps may be assigned to the simulation case and the hardware. This makes it possible to perform the HIL simulation with even large systems of simulation with acceptable convergence speed since the simulation need not be in real-time.

WR can also be used for the iterative simulation of large systems, where the system is divided into two or more different subsystems and each is simulated independent of the other(s). The results are exchanged when simulations end, and the simulations are repeated. If certain convergence criteria are satisfied, the simulation results show no more changes after enough number of iterations, and can be said to have converged, however when one of the subsystems is a real hardware, although the simulation is repeated in non-real-time, the waveforms must be exchanged to the hardware in real-time in order to attain accurate and valid response of the hardware. The main function of the RTPR 130 is to capture non-real-time waveforms from the software and playback the data to the hardware in real-time and record the response of the hardware every time a new data is played.

There are two common WR forms: Gauss-Jacobi (GJ) and Gauss-Seidel (GS), although modified forms of the GS-WR and GS-WR may be utilized. A description of Gauss-Seidel WR is provided below. Consider the initial value problem of the ODE system of equations (1a & 1b), where $x_i$ are the state variables and $f_i$ are arbitrary functions.

$$\begin{cases} \dot{x}_1 = f_1(x_1 x_2 t); & x_1(0) = X_1 \\ \dot{x}_2 = f_2(x_1 x_2 t); & x_2(0) = X_2 \end{cases} \quad (1a)$$
$$(1b)$$

The total interval of simulation is T. Time-steps $\Delta t_1$ and $\Delta t_2$ are used to numerically integrate (1a) and (1b) respectively. Here, $\Delta t_1$ and $\Delta t_2$ and are not necessarily equal. It is convenient to have $=N_1\Delta t_1=N_2\Delta t_2$, where $N_1$ and $N_2$ are integers. Two separate simulations are conducted sequentially, one for (1a) and the other for (1b). In the first iteration, while 1a) is being integrated to yield an estimate for $X_1$, an arbitrary $N_2$ point waveform $x_2^0 = \{x_2^0(0), x_2^0(\Delta t_2), x_2^0(2\Delta t_2), \ldots, x_2^0(N_2\Delta t_2)\}$ is assumed for $X_2$. The only condition is that $x_2^0(0)=X_2$ to satisfy the initial condition of the ODE (1b). Note that while integrating (1a) the time step is $\Delta t_1$, so if necessary, the assumed waveform $x_2^0$ may have to be interpolated to fall on the multiples of $\Delta t_1$.

When simulation ends, the first iteration solution $x_1^1 = \{x_1^1(0)=X_1, x_1^1(\Delta t_1), x_1^1(2\Delta t_1), \ldots, x_1^1(N_1\Delta t_1)\}$ is passed as an input for the numerical integration of the second equation (1b) which yields $x_2^1(t)$. In the next iteration, $x_2^1(t)$ is used as the known waveform in solving (1a) and so on. Iterations are continued until the simulated waveforms converge (say after N iterations) i.e., the difference between successive iterations is below the convergence threshold The iteration equations as the GS-WR applied to equation (1) can be written as equation (2).

$$\begin{cases} \dot{x}_1^{k+1} = f_1(x_1^{k+1}, x_2^k, t); \\ \dot{x}_2^{k+1} = f_2(x_1^{k+1}, x_2^{k+1}, t); \end{cases}, k = 0, 1, 2, \ldots, N-1 \quad (2)$$

When the resultant equations from a circuit splitting appear in the form of $Ax=b$, the WR method performs as an operator which decomposes the A matrix in three strictly lower triangular, strictly upper triangular, and diagonal matrices, L, U, and D, respectively where $A=L+D+U$. The iteration equations of the GS-WR for algebraic equations can be presented as (3).

$$x^{k+1} = -(L+D)^{-1}Ux^k + (L+D)^{-1}b \quad (3)$$
$$= M_{GS}x^k + (L+D)^{-1}b$$

where x is the vector of the WR variables. From (3), if $M_{GS}$, the WR operator matrix, has a spectral radius smaller than unity, i.e. the eigenvalue with largest amplitude is within the unity circle, then GS-WR converges.

If the system's equations form ODEs of $B\dot{x}+Ax=b$, all the eigenvalues of MGS should place inside the unity circle to guarantee the convergence of the simulation. In this case, $M_{GS}=-(L_B+D_B)^{-1}U$, where $B=L_B+D_B+U_B$.

The DAE-Index-I system of (4) is considered.

$$\begin{cases} \dot{x}^{k+1} = F(x^{k+1}, x^k, \dot{x}^{k+1}, \dot{x}^k, z^{k+1}, z^k) \\ z^{k+1} = G(x^{k+1}, x^k, \dot{x}^{k+1}, \dot{x}^k, z^{k+1}, z^k) \end{cases} \quad (4)$$

The first step is to rearrange the extracted equations from the system in the form of (4). From that, the Lipschitz coefficients of both sets of ODEs and Algebraics can be obtained. $a_i, i=\{1, 2, \ldots, 6\}$ and $b_i, i=\{1, 2, \ldots, 6\}$ are the Lipschitz coefficients. The WR operator matrix can be defined as (5).

$$M = \begin{bmatrix} a_3 + a_4 & a_5 + a_6 \\ b_3 + b_4 & b_5 + b_6 \end{bmatrix} \quad (5)$$

The spectral radius of M must be within the unity circle to satisfy the convergence conditions of (4).

Figure 2:
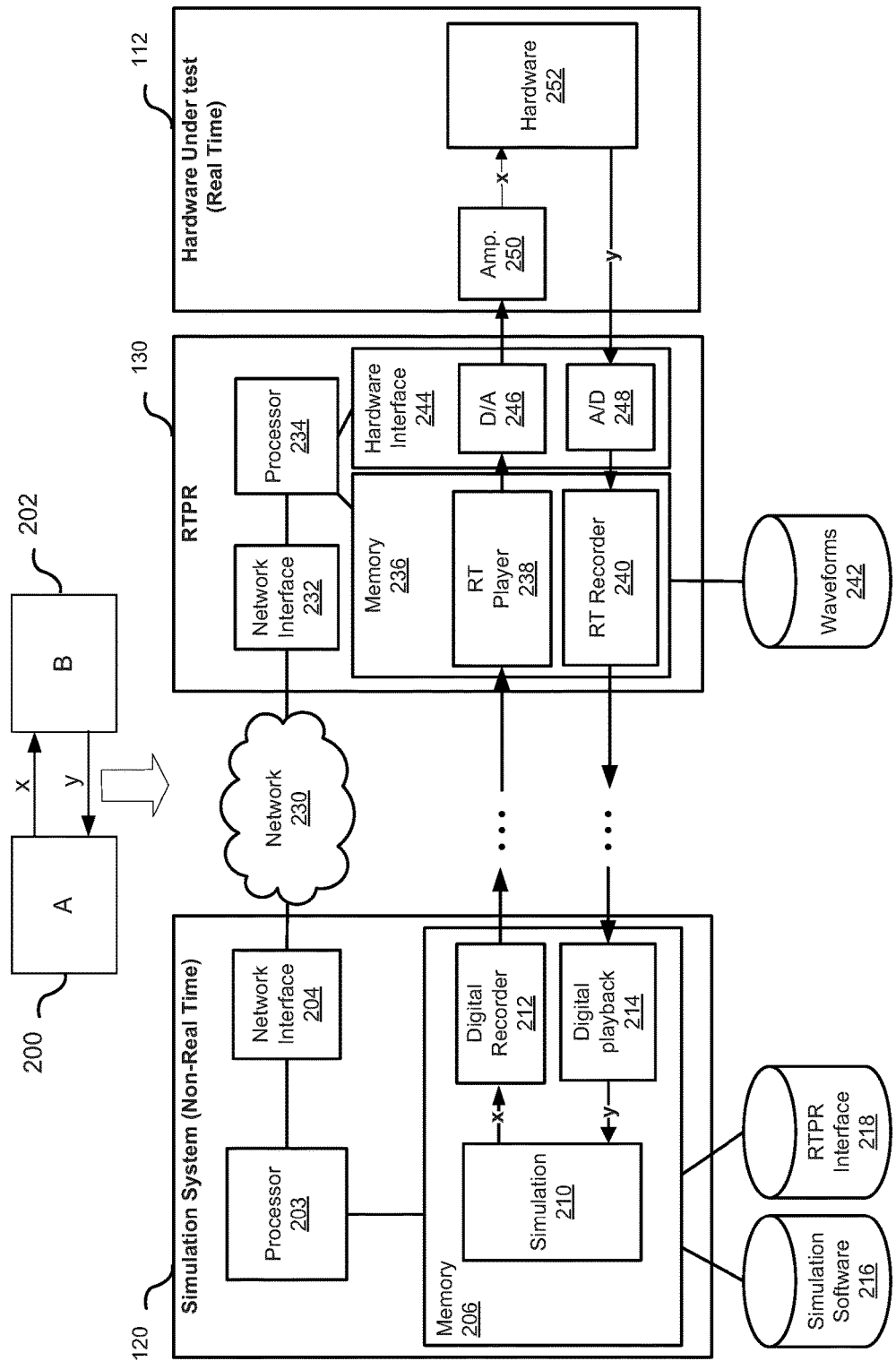
FIG. 2 shows a representation of a system for waveform relaxation (WR) based Hardware-in-the-Loop (HIL) simulation.

Traditionally WR has been a purely software algorithm for independent simulation of a coupled system by decoupling. The use of WR is extended beyond this classical form by generalizing it to iteratively solve coupled dynamical systems, either simulated or actually implemented in analog hardware. Thus, only part of the system is numerically modeled, with the other part built in hardware. In this scheme, the host system, into which the hardware is connected, is modeled in a non-real-time electromagnetic transient (EMT) simulation program as shown in FIG. 2 as system A 200. The waveforms or signal 'x' generated by this simulation over the entire simulation interval are captured (off-line), and stored in the RTPR 130. Using a suitable interface amplifier, this waveform 'x' can be played in real-time to the HUT 112 which is shown as system B 202, and the resulting waveforms 'y' can be recorded and digitized. This recorded waveform is fed as an input to the off-line simulator, to generate the next iteration of output 'x'. This process continues iteratively until convergence. The approach captured in FIG. 2 could represent many scenarios. For example, system A 200 could be a power system controlled by a hardware controller B 202. In this case, 'y' is the control input to system A 200, and 'x' is the feedback from the power system to the controller. If the connection is an electrical node, 'x' could be the voltage applied by system A 200 to system B 202, and 'y' could be the measured current in system B 202 to be used as an input for system A 200.

Assuming that the HUT 112 is a controller to be connected to the electrical network, the simulation interval is [0, T], and the simulation timestep is $\Delta t$. For convenience, assume $T=N\Delta t$. An initial guess (for example, $y^0(n\Delta t)=0$, $n \in \{0, 1, \ldots, N\}$) is applied to system A 200, as the waveform measured at the terminals of system B 202. The simulation is run for a total simulation time of T. The output of the simulation is the waveform $x^0(n\Delta t)$, $n \in \{0, 1, \ldots, N\}$, which is recorded and at the end of the simulation, played back in real-time using a D/A converter and suitable amplifier to the HUT (system B 202) as the initial response of the electrical network (system A 200). This produces a (sampled) output $y^1(n\Delta t)$, $n \in \{0, 1, \ldots, N\}$ from system B 202. In the second iteration, $y^1(n\Delta t)$, $n \in \{0, 1, \ldots, N\}$ is applied to the simulated system A 200, and its output $x^1(n\Delta t)$, $n \in \{1, 2, \ldots, N\}$ is once again recorded, for later playback to system B 202. This iterative process continues until K iterations, when sequences $x^K(n\Delta t)$ and $x^{K-1}(n\Delta t)$ as well as the sequences $y^K(n\Delta t)$ and $y^{K-1}(n\Delta t)$ are essentially identical, i.e.: $\Sigma_{n=0}^{N}(|x^K(n\Delta t)-x^{K-1}(n\Delta t)|+yK(n\Delta t)-yK-1(n\Delta t) < \varepsilon$.

Assigning different simulation and hardware time steps are allowed in the WR based HIL simulation, therefore, a suitably small simulation time step can be assigned to the simulation whereas the HUT receives the waveforms with a larger sampling time. As a result, HIL simulation 106 of a system with any size and a small simulation time step is feasible since the simulation 120 is decoupled from the HUT 112.

Note that although the above example considered a controller for system B 202, it could also have been a piece of power hardware under test. Clearly, the communication delay has no effect on the simulation results and therefore the controller could be situated geographically far from the non-real-time simulator. WR can also be utilized to iteratively solve for multiple subsystems. For instance, two controllers and one simulation where each controller is placed far from the other and from the simulation. In this case, one RTPR is required to be connected to each controller. This feature can avoid any additional HIL simulation costs from the controller's shipment.

The simulation system 120 can be executed by a computing device having a processor 203 coupled to a memory 206. The processor 203 executes instructions stored in memory 206 to perform simulation 210. The simulation 210 may be generated by simulation software 216 which may be stored either locally or remotely relative to the simulation system 120. Software for providing the RTPR interface 218 may also be locally or remotely stored relative to the simulation system 120. The RTPR 130 is able to communicate with the simulation system 120 via wired or wireless interfaces. The RTPR 130 may also communicate with the HUT 112 by wired or wireless interface and can accept analog inputs, provide analog outputs having a resolution such as for example 10 bits, accept digital inputs, and provide digital outputs. The RTPR 130 can play the data in different time steps as small as microseconds. The operation of the RTPR 130 may be executed from software stored in local memory or received by a network connection.

At the first iteration of the WR method, an initial waveform as the response of the hardware to be integrated within the simulation, is applied to the simulation and the hardware input signal is recorded at every time step. The simulation generates signal 'x' to be provided to the HUT 112. The waveforms or signals are recorded by a recorder element 212 and transmitted via a network interface 204 through a network to the RTPR 130 at a network interface 232. Processor 234 of the RTPR 130 is coupled to a memory 236 providing real-time player element 238 for playing back the waveform captured by the digital recorder 212. A hardware interface 244 coupled to processor 234 provides a digital-to-analog (D/A) converter 246 for interfacing with the HUT 112. An amplifier 250 may be provided at the HUT 112 or associated with the RTPR 130 if necessary. The waveform 'x' is then provided to the hardware component 252, this signal is played back in real-time to the hardware and the hardware response is sampled at every time step. This updated waveform is sent back to the simulation for the next iteration of the WR method. The response 'y' of the hardware component 112 is received by an analog-to-digital (A/D) converter 248 and recorded by the real-time recorder 240. The RTPR 130 may store waveforms 242 that have been received by the simulations system 120 or received by the HUT 112. The RTPR 130 then provides the signal to the digital playback element 214 through network 230 which then provides the waveform signal 'y' to the simulation 210 which can be provided in non-real-time. The simulation system 120 receives the response waveform 'y'. The process continues until a convergence criterion is satisfied. Although the system has been described as communication between the RTPR and simulation system using a communication network, such as the Internet, the simulation system may be connected directly to the RTPR using a wired connection such as for example a serial connection, local area network or local wireless communication connections.

Figure 3:
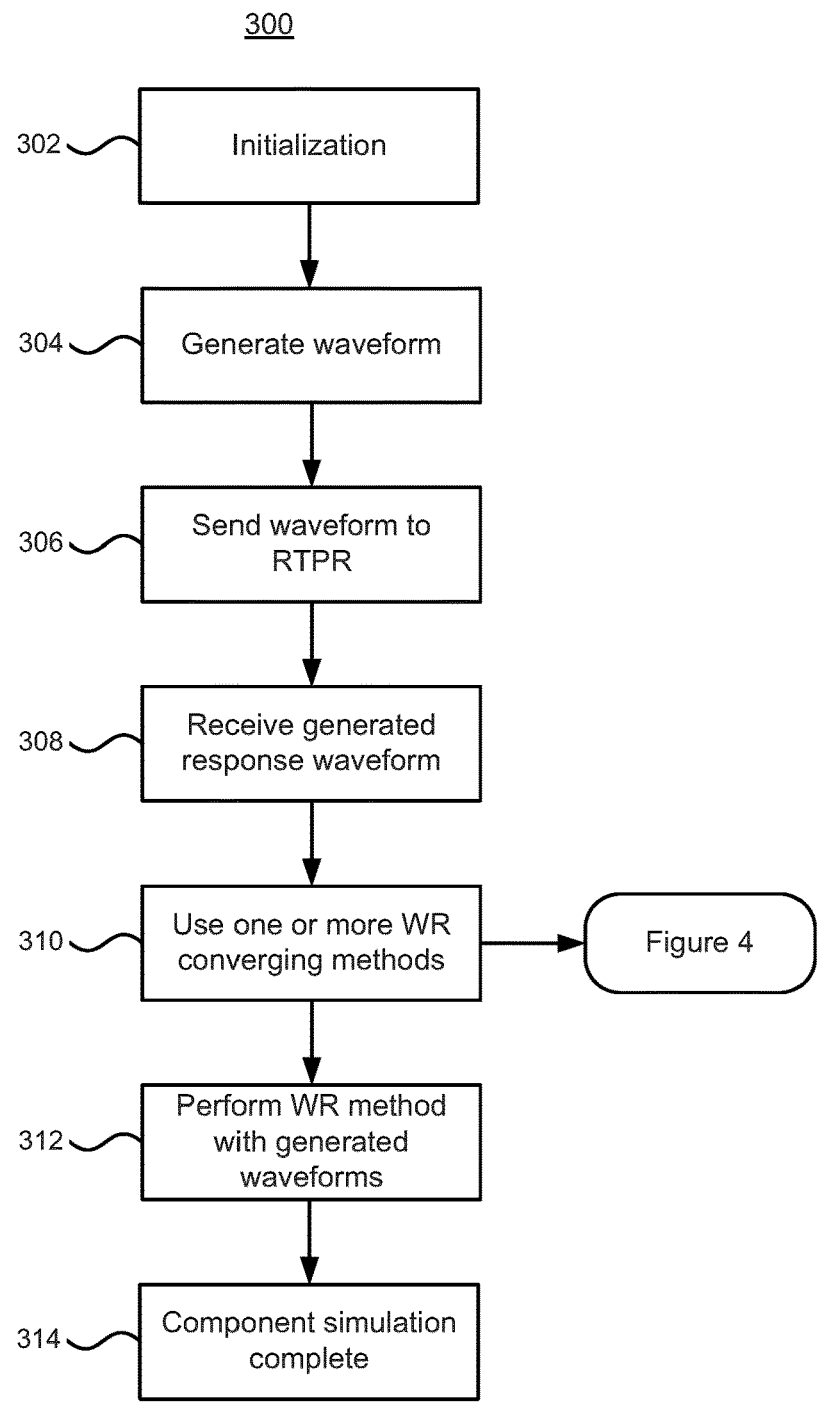
FIG. 3 shows a method for closed loop simulation of a computer model of a physical system and an actual real-time hardware component of the physical system.
Figure 4:
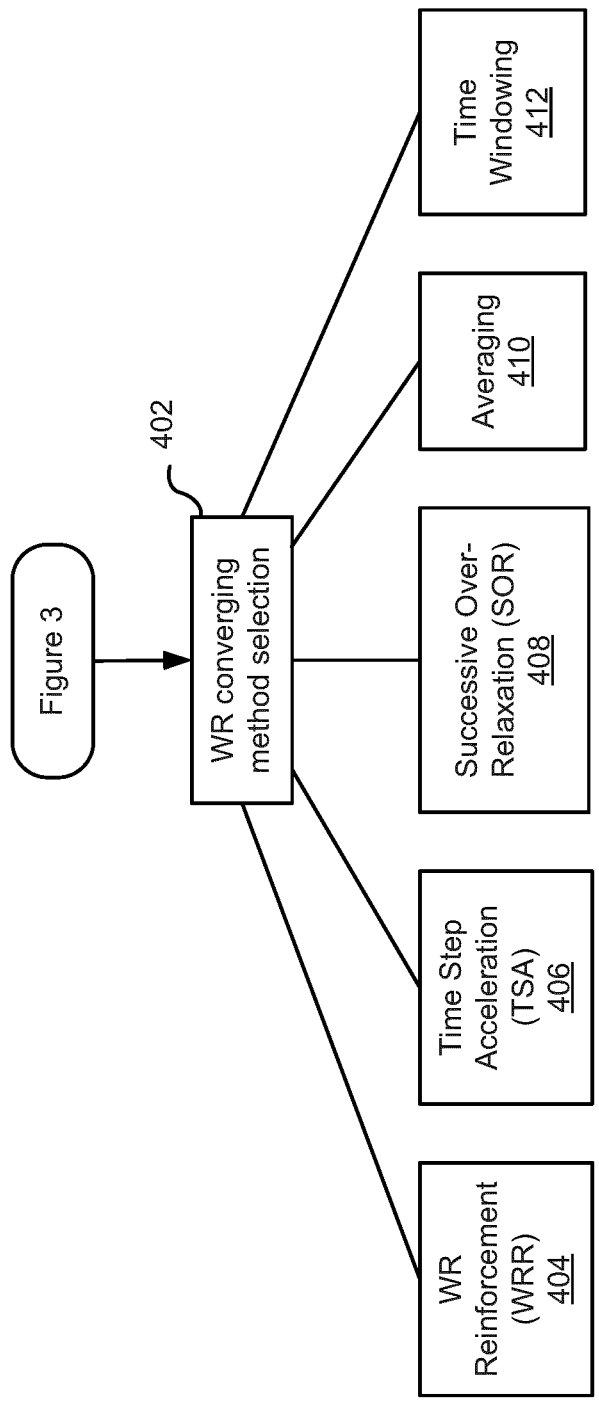
FIG. 4 shows a WR converging method selection.

FIG. 3 shows a method 300 for closed loop simulation of a computer model of a physical system and an actual real-time hardware component of the physical system. The method 300 commences with the initialization of the simulation parameters to an initial state (302). At a simulation processor an input waveform is generated for a component under test (304). The waveform is generated from a simulated model of the physical system using an initial waveform as a response waveform of the component. The simulation processor then sends through a network the generated input waveform to the RTPR connected to the component (306), the RTPR 130 resets the component 112 to an initial state and plays back the waveform in real-time for the component, the RTPR receiving a real-time response waveform generated from the component. The generated response waveform of the component is received at the simulation processor from the RTPR through the network (308). One or more WR converging methods, as described in connection with FIG. 4, are used at the simulation processor to enable convergence of the generated waveforms affected by hardware induced distortions (310). A WR method is then performed with the generated waveforms (312). The WR method is performed with the exchanging of waveforms until convergence criteria are met.

FIG. 4 shows a representation WR converging method selection. The WR converging methods can provide acceleration or stabilization techniques. In order to understand the difference between acceleration and stabilization techniques, a brief discussion about an important parameter called the spectral radius of the WR operator matrix is provided.

Depending on the subsystems to be solved by the WR method, different sets of iteration equations may be extracted: Algebraic (AE), Differential (ODE), and Differential-Algebraic (DAE). For each case, a WR operator matrix is defined. The spectral radius is defined as the maximum eigenvalue of the operator matrix. The WR converges if the spectral radius is smaller than unity. Generally speaking, the WR convergence is faster for smaller spectral radii. Acceleration techniques reduce the total required time, but not necessarily number of iterations, for the WR to converge. Not all of these techniques affect the spectral radius of the WR operator. A stabilization technique keeps the spectral radius of the WR operator inside unity circle. It may fast up or even slow down the convergence if applied to a WR simulation in stable regions depending on the parameters settings.

In order to increase the damping factor of the WR simulation against noise and data conversion inaccuracies, the spectral radius of the WR operator should be reduced by application of appropriate techniques.

During the execution of method 300 one or more WR converging methods are selected (402). The one or more selected methods may be utilized to accelerate convergence of the waveforms and may be preselected, iteratively selected, or dynamically selected based upon the simulation type and configuration either during the operation of method 300 or prior to execution of method 300. It is also conceivable that the selection of WR converging methods can be selected or modified during execution. Each of the methods are described below.

WR Reinforcement (WRR) Method (404)

When the WR is applied to integrate decoupled subsystems, one subsystem does not "see" the other subsystem(s) while being simulated. If the connection between the simulated subsystem and the rest of subsystems is relatively tight, then the WR converges slowly. Assuming that there are two subsystems of "simulation" (non-real-time) and "hardware" (real-time) to be solved, an approximated model of the hardware is directly connected to the simulation. The waveform response of the hardware model inside the simulation recorded in a previous iteration is subtracted from the waveform in a current iteration. The subtracted waveform tends to zero in the last iterations of the WR and therefore does not affect the simulation accuracy. By providing the hardware model the "simulation" subsystem "sees" an approximated behavior of the hardware and therefore the resulted waveforms are not too different from the converged response.

Figure 5:
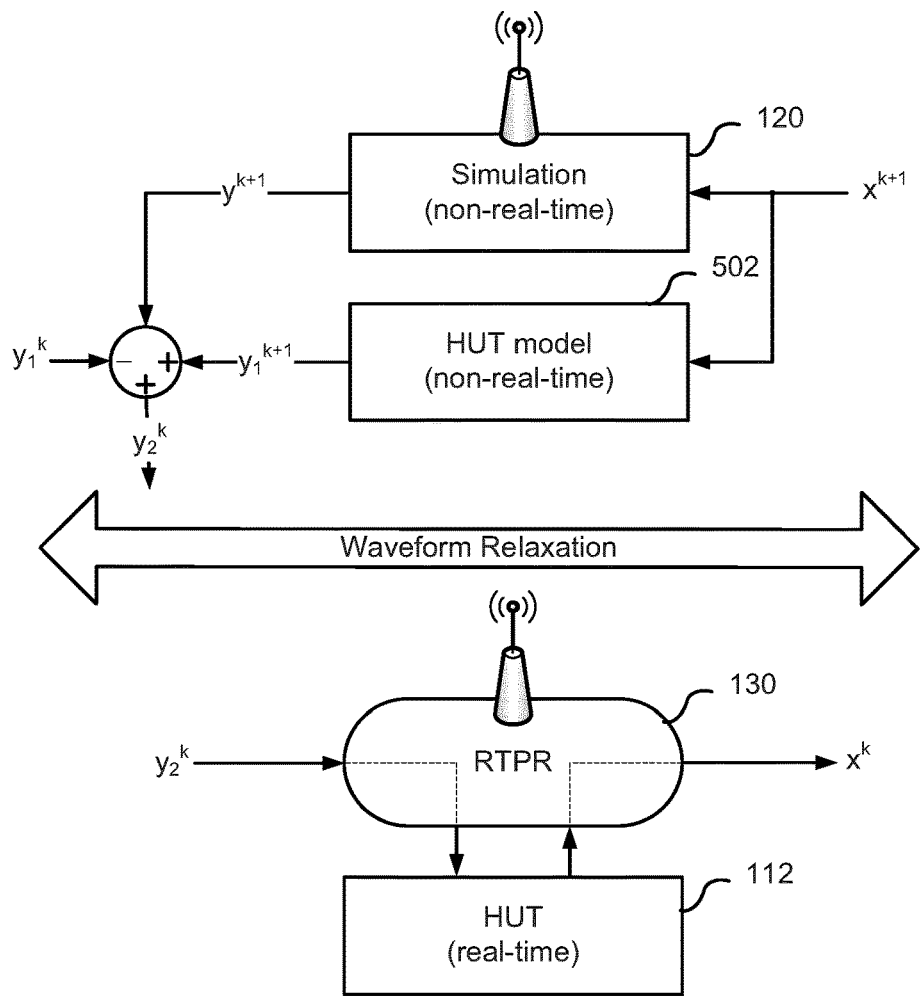
FIG. 5 shows a representation of a first WR reinforcement converging method.

The WRR technique reduces the spectral radius of the WR operator and therefore increases the robustness of the simulation against the noise and the interface inaccuracies. It also reduces the number of WR iterations to reach the convergence. As a result, this method is very suitable for the WR based HIL simulation. FIG. 5 shows a method 500 of how to implement WRR for the WR based HIL simulation. Although the detailed model of a controller under test might not be on hand, the general function of the controller may be anticipated as testing a controller means comparing the response of the controller with what is expected. On the other hand, the purpose of HIL simulation could be optimization of the parameters of a known controller, therefore, it is generally acceptable to presume that at least an approximated model of the hardware under test is achievable.

In regular WR method, the simulation 120 does not directly "see" the hardware 112. In this technique, the model 502 of the hardware 112 is directly attached to the simulation 120. The simulation 120 with the attached hardware model 502 are simulated for the assigned simulation interval and two sets of waveforms or signals of "x", the waveform(s) to be applied to the hardware 112, and "$y_1$", the response of the hardware model 502 connected to the simulation, are recorded. The waveform "x" is sent to the RTPR 130 via a communication interface. The RTPR 130 plays back the waveform "x" to the actual hardware 112 in real-time and records the hardware response as "$y_2$" and sends it back to the simulation via the same communication method. At the next iteration, while running the simulation with the attached hardware model 502, the recorded response of the hardware model 502 at the previous iteration, $y_1^k$, is sampled and subtracted from the summation of the current iteration response of the hardware model, $y_1^{k+1}$, and the recorded response of the actual hardware 112 from previous iteration, $y_2^k$, and applied as the manipulated hardware response, $y^{k+1}$, to the simulation as (6).

$$y^{k+1}=y_1^{k+1}+y_2^k-y_1^k=y_2^k+(y_1^{k+1}-y_1^k) \quad (6)$$

After enough number of iterations, if the convergence criterion is satisfied, every waveform remains the same in next iterations as shown in (6). Thus, the hardware response is the only waveform that enters into the Simulation in iterations close to the convergence because $y_1^{k+1}-y_1^k$ tends to zero. If the hardware model represents the exact behavior of the actual hardware, in an ideal case, the WR converges in the first iteration. From this analysis, it can be summarized that the above method can greatly improve the speed of WR convergence depending on the accuracy of the model without affecting the accuracy of the converged results.

$$\lim_{k\to\infty}(y^{k+1})=\lim_{k\to\infty}(y_2^k+(y_1^{k+1}-y_1^k))=y_2^k \quad (7)$$

According to (7), in order to apply the WRR technique of method 500, $y_1$ and $y_2$ must be analog signals. In the cases where these waveforms are switching pulses, e.g. testing a rectifier controller whose output signals are firing pulses, this method is inapplicable.

Figure 6:
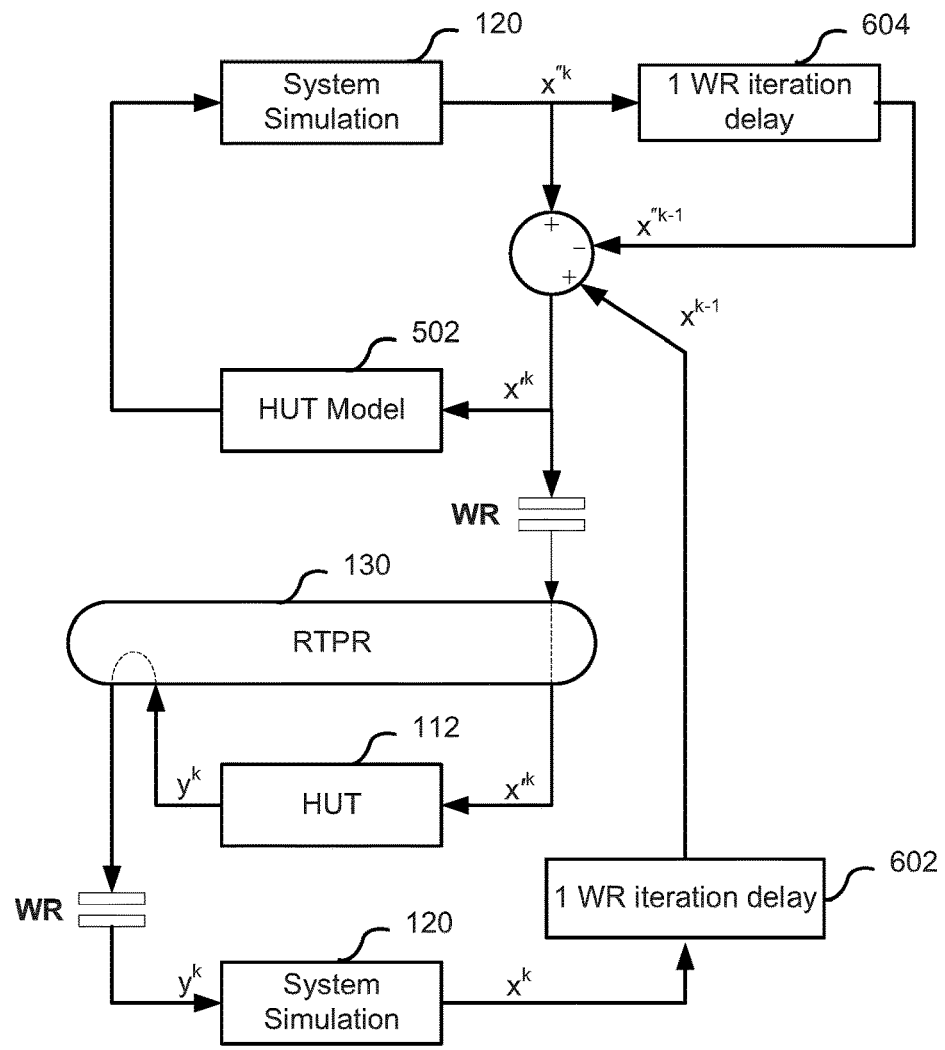
FIG. 6 shows a representation of a second WR reinforcement converging method.

An alternative WRR method 600 is shown in FIG. 6. It is assumed that the HUT 112 receives analog waveforms no matter if its response is analog or pulse. In this configuration, the addition and subtraction operations are applied to HUT input waveforms. The system model 120 is repeated as a separate subsystem and the model 502 of the HUT is attached to one. The system model 120 with the attached HUT model 502 is simulated at the first WR iteration and the HUT model's 502 input signal, $x'^k$, is recorded for the whole simulation time. Also, the response of the system model 120, $x''^k$, is recorded to be used in the next iteration. If all WR waveforms are initialized to zero, $x'^1=x''^1$ (only in the first iteration) applies. Then, $x'^k$ is sent to the RTPR 130 and played in real-time to the HUT 112 and the response waveform, $y^k$, is recorded. $y^k$, which could be a train of pulses, is applied as input to the system model simulation 120 without the HUT model 502 and the response of the system model, $x^k$, is recorded. The first WR iteration terminates at this point. At the next iteration, the response of the system simulation 120 to the HUT model 502 from the previous iteration, $x'^{k-1}$, 604 as well as the system simulation 120 response to the HUT 112 output signal from the previous iteration, $x^{k-1}$, 602 are subtracted and added, respectively, to the response waveform of the system simulation 120 with the attached HUT model 502, $x''^k$.

In the special case of HUT model 502 to be exactly the same as the HUT 112, the WR converges in the first iteration similar to the first WRR method described in connection with FIG. 5. Accordingly, this method can accelerate the WR convergence, as well as the first WRR method described in FIG. 5, if an approximated model 502 of the HUT 112 is available.

In a typical application, if the HUT 112 accepts pulse waveforms and the response is analog, then the first WRR method should be used. On the other hand, if the HUT 112 response is firing pulses and it accepts analog signals as input, the second WRR method should be applied. Also, if both input and output signals of the HUT 112 are analog waveforms, both methods are applicable, but the first WRR method 500 is preferred since it needs one less subsystem and therefore one less simulation in every iteration and less memory.

Figure 7:
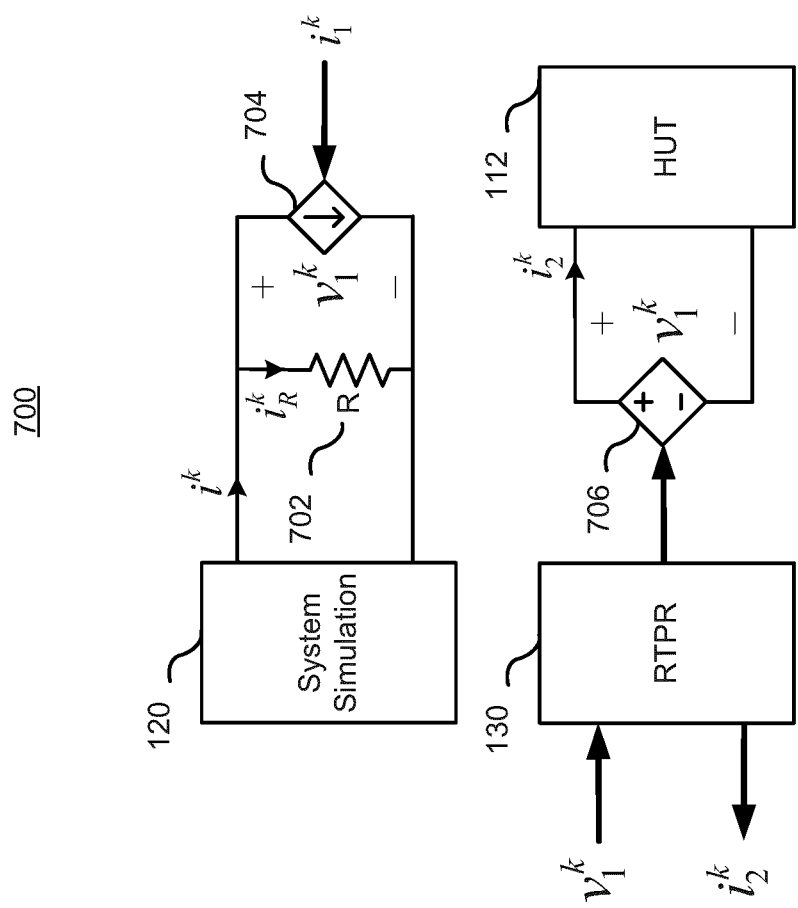
FIG. 7 shows a system to illustrate a WR stabilization method.

Referring to FIG. 7, a system representation 700 is shown to illustrate a WR stabilization method as a specialized WRR reinforcement technique of the WRR method described in FIG. 5 where the HUT component is a power hardware component. In this case, the approximated model of the HUT 112 is a damping resistor 702 connected to the simulated system in parallel. Unlike the controller, when the HUT is a power hardware component, an interface method should be used to connect the two subsystems, i.e. HUT 112 and the system simulation 120 waveforms. The interfaces 704 706 shown in FIG. 7 form an ideal transformer model, where the sampled current of HUT 112 is injected into the system simulation 120 by means of a dependent current source 704 and the voltage sampled across the dependent current source 704 is applied to the HUT 112 by means of a dependent voltage source 706 which is driven by the RTPR 130. The method described in the following description is for, but not limited to, the ideal transformer model 704 706 of interface and can be used for other types of interfaces. The first iteration of WR begins with the system simulation 120 with the parallel resistor 702 and the current source 704 which injects an initial guess current waveform to the system. The current applied to the current source 704 at iteration k is $i_1^k = i_2^{k-1} - i_R^{k-1}$, where $i_R^{k-1}$ is the sampled current passing through the parallel resistor R 702 at a previous iteration and $i_2^{k-1}$ is the sampled current of the HUT from the previous iteration. It is found that the total current passing through the system simulation 120 at a current iteration is $i^k = i_1^k + i_R^k = i_2^{k-1} + i_R^k - i_R^{k-1}$. The voltage across the dependent current source 704, $V_1^k$, is measured and recorded and sent to the RTPR 130 which plays it back in real time to the HUT 112 and captures its response. With selection of a small value for R 702, the convergence becomes slower but the stability of the simulation is more secured. Inversely, with a larger R 702, the simulation converges faster but the region of stability decreases. In fact, the stability criterion of such system without the parallel resistor, is the equivalent Thevenin resistance of the system simulation 120 should be smaller than that of HUT 112 for resistive networks and the equivalent Thevenin inductance of the system simulation 120 should be smaller than that of HUT for general cases of networks. With a nonlinear equivalent Thevenin impedance in either the system simulation or the HUT 112, the simulation may alter between the stable and unstable regions. Once the simulation enters the unstable region, then it diverges. As a result, the value of R 702 should be selected such small that in all possible impedance changes in either system simulation 120 or HUT 112, the equivalent impedance of the system simulation 120 in parallel with R remains smaller than the equivalent impedance of the HUT 112. When the WR simulation for FIG. 7 converges, $i_R^N = i_R^{N-1}$ which means that a current loop is created between the R 702 and the current source 704 and the only current entering to the System Simulation 120 is the HUT 112 measured current, $i^N = i_2^{N-1} + i_R^N - i_R^{N-1} = i_2^{N-1}$. This means that the method ensures the stability of the WR simulation without affecting the simulation results accuracy.

Time Step Acceleration Method (TSA) (406)

There are different methodologies of applying the Time Step Acceleration (TSA) technique to the WR simulation. One method is to start the simulations with large time steps and dynamically decrease them to the final desired values. In this scheme, the change from one time step to the next happens regardless of the convergence of the WR. Another technique is to define a sequence of descending time steps and have the WR converged for each and change to the next. Although this method usually increases the number of iterations, the WR might be accelerated depending on the number of iterations performed with larger time steps.

As an example, an appropriately large time step is assigned to one or more subsystems and the WR is allowed to converge with an "easy" convergence criterion. The time step is then changed to the desired final value and the WR needs a few iterations to refine the solution regarding to the smaller time step and converge based on a "fine" convergence criterion. The size of the waveforms exchanged with the RTPR 130 in the iterations with the large time step is smaller and therefore it takes less communication time. Consequently, an approximated response can be found with the large time step quickly and the more accurate response can be obtained in a few iterations with larger communication time. Therefore, the path to the convergence might have been increased but more part of it is undertaken with a higher speed of the WR. This method does not affect the spectral radius of the WR operator but may accelerate the WR based HIL simulation.

Successive Over-Relaxation (SOR) Method (408)

The Successive Over-Relaxation (SOR) is a WR acceleration technique in which a weighted combination of two consecutive iterations is used as the updated waveforms from a subsystem. As an example, consider the iteration equations of a GS-WR applied to a two variable ODE system given in (2).

Once $x_1^{k+1}$ is achieved from integrating (1a), a modified variable relating to say $x_1'$, is calculated from $x_1'^{k+1} = x_1^k + K(x_1^{k+1} - x_1^k)$, where $0 < K < 2$ and fed to (1b) to update $x_2$. In turn, after updating $x_2^{k+1}$, the modified parameter of $x_2'$, is calculated from $x_2'^{k+1} = x_2^k + K(x_2^{k+1} - x_2^k)$ and fed to (1a) for the next iteration. The SOR-GS-WR iteration equations for the system of (1) can be written as (8).

$$\begin{cases} \dot{x}_1^{k+1} = f_1(x_1'^{k+1}, x_2'^k, t); x_2'^k = x_2^{k-1} + K(x_s^k - x_2^{k-1}) \\ \dot{x}_2^{k+1} = f_2(x_1'^{k+1}, x_2'^{k+1}, t); x_1'^{k+1} = x_1^k + K(x_1^{k+1} - x_1^k) \end{cases} \quad (8)$$

The selection of the constant K is important in the convergence speed. Optimum K may be obtained for a typical system with minimizing the new spectral radius of the system. The technique may be disabled by setting K=1.

With a proper choice of K parameter, the spectral radius of the WR simulation can be decreased. Therefore, the WR based HIL simulation robustness against the noise and the interface inaccuracies may be increased by the SOR technique. It also reduces the number of iterations required for the WR convergence and therefore the total RTPR communication delay is reduced. The hurdle, however, in this application is that one subsystem is an actual hardware, e.g. a complicate controller, and therefore there may not be an available mathematical expression for that particular hardware in order to calculate an optimum K. From experimental results, it is found that K≈0.9 accelerates the WR in an acceptable ratio.

Averaging (410)

Averaging waveforms of consecutive WR iterations is provided to decrease the impact of the noise and hardware subsystem parameters changes on the convergence of the WR simulation. Noise can be considered as a parameter of the hardware subsystem that changes in every WR iteration. If the magnitude of the noise is comparable with the hardware input or output signals, then every converged part of the waveforms are subject to diverge in next iterations. On the other hand, even without the noise, the simulation can diverge if part of one of the subsystem changes during WR iterations. For example, a low precision timer in the hardware, or random communication delay time between two parts of the hardware subsystem, e.g. two separate controllers connected to each other by LAN and together considered as one WR subsystem, can cause the simulation divergence. The solution is designed to address the issue caused by the noise and can also be used for the cases where there is slight change in the hardware subsystem.

Figure 8:
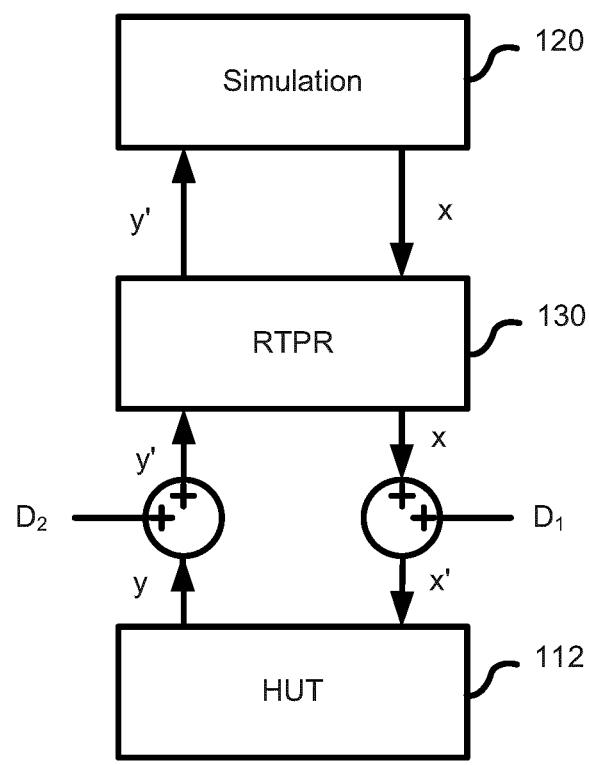
FIG. 8 shows a representation of the impact of noise and hardware subsystem parameter changes.

FIG. 8 shows a system 800 comprising the simulation 120 and hardware subsystems 112 with the noise being injected in the input and output terminals of the hardware in communication with the RTPR 130, where $D_i$ is the noise. Suppose that the WR has accomplished k successful iterations and the signals x and y are converged for the interval of [0 T/2], T being the total simulation time, and the noise $D_1$ enters the hardware input signal ($x^{k+1}$) at iteration k+1 at time t=T/4 with a significant magnitude. Because the response of the hardware at t=T/4, $x^{k+1}$, is different from the previous iteration ($y^k$(T/4)) the convergence of the waveform is lost for the interval of [T/4 T/2] and therefore the total simulation time spent to make this part of waveforms converge is wasted and should be repeated. If the noise keeps entering the waveforms, this problem remains and therefore, the simulation never converges to a solution.

The average of the waveforms in L consecutive WR iterations for part of the signal which is converged for at least L+1 iterations is equal to each waveform of the last L iterations assuming that no noise has affected the waveforms. If the noise entered to one of the waveforms in one of the last L iterations, the magnitude of the noise in the averaged waveform is 1/L of the noise magnitude. Therefore, applying the average waveform of $$\bar{y}_L^k = \frac{\sum_{i=k-L-1}^{k}(\acute{y}^i)}{L}$$

as the response of the hardware to the simulation decreases the effect of the $D_i$ noise. The averaging method protects the converged parts of the waveforms against the noise but the drawback is that the changes in the waveforms in new iterations for the under-convergence parts of the waveforms are also reduced which leads to a very slow general convergence of the simulation. As a result, it is best to allow changes in the non-converged parts and disallow changes (the noise) in the converged parts. Such waveform can be constructed by (9), where $y^k$ is the manipulated hardware response to be applied to the simulation subsystem, $\acute{y}^k$ is the actual noisy response of the hardware at the current iteration k, $\bar{y}_L^k$ is the average of the hardware response waveforms in the last L iterations, and W is the "weighting" waveform which is limited between 0 and 1. The objective is to find a W waveform such that it has small values for the converged part of the waveform y and larger values (still less than unity) for under-convergence part. If W is found appropriately, the share of the average signal is more than the actual response of the hardware for the converged part so that the noise has less effect. Accordingly, the changes in non-converged parts of the waveform are allowed by giving a larger share to the actual response of the hardware.

$$y^k = W \cdot \acute{y}^k + (1-W) \cdot \bar{y}_L^k \quad (9)$$

In order to form such W waveform, a normalized distance waveform "d" is defined in (10). The normalized difference between the average waveform and the actual hardware response is calculated for each simulation time step in the interval [0 T], where T is the total simulation time. If d has a small value for a certain time point, it can be said that the waveform is converged at that time and vice versa. As a result, W and d waveforms are directly related.

$$d^k = \left| \frac{\acute{y}^k - \bar{y}_L^k}{\bar{y}_L^k} \right| \quad (10)$$

Since the averaging is performed on the last L iterations, the history of the converged parts in the earlier iterations is lost. It is best if W has very small values (close to zero) for parts of the waveform y that have been converged for a large number of iterations (>L). In order to preserve the convergence history of the waveform over all iterations, the waveform N is defined as follows: At $k^{th}$ iteration, for every $t° \in [0:\Delta t:T]$, do $N^k(t=t°) = N^{k-1}(t=t°)+1$ if $d^k(t=t°) < \delta$; where $\Delta t$ is the simulation time step, T is the total simulation time, d is the normalized distance waveform defined in (10), and $\delta$ is a number between 0 and 1. If the calculated normalized distance between the average and the current iteration waveforms is less than $\delta$, then the accumulative N waveform is incremented by 1. Large value of N at a certain time point of the waveform means that the waveform is converged for that time, therefore, W and N are inversely related.

A proportional coefficient K is also defined in order to control the convergence speed. With a large K, the averaging method has less effect in early iterations and therefore, if the noise is not significant, the simulation converges fast before the averaging method takes over the control. However, if there is significant noise or any change in the hardware parameters, a smaller K decreases the total simulation time by allowing the averaging method from early iterations. Finally, the weighting waveform W at iteration k is defined as (11).

$$W^k = K \frac{d^k}{N^k}; W^k(t=t^0) = 1 \text{ if } W^k(t=t^0) > 1, t^0 \in [0:\Delta t:T] \quad (11)$$

A new convergence criterion is defined when the averaging method is applied since the waveform at the current iteration is compared to the average of the waveforms in the last L iteration. A convergence parameter $\beta$ is defined as a small number and compared to the W waveform at every iteration. For every $t \in [0:\Delta t:T]$ at iteration k if $W^k(t) < \beta$, the simulation is converged and the converged response is $\bar{y}_L^k$. This result shows that if a parameter in the hardware has slight changes at every WR iteration, such as noise, the converged response corresponds to the average of the changes of that parameter (or noise) in the last L iterations. If the averaging method is not used though, the simulation will not converge due to the changes in the hardware.

Time Windowing (412)

It is well known that the waveforms in the WR simulations converge gradually from the time of zero to T (the simulation ending time) as the iterations increase. Consequently, a converged part of the waveform is repeated in next iterations of the WR. On the other hand, the convergence of the WR is known to be faster for smaller time intervals. It is theoretically said that given a typical system, there is always a finite time interval in which the WR convergence is guaranteed whereas the same simulation can diverge for larger time intervals. Time Windowing technique can be utilized to take into account the two mentioned facts. In the Time Windowing technique the simulation interval is split into several time windows and the WR is performed for each window. The initial values for system parameters in each window are set equal to the last data points of the converged waveforms in the previous window. With this technique, some simulation time is saved because the converged sections of the waveforms are not repeated in next windows. Also, because the simulation interval is reduced for each window, the chance of the WR convergence for a typical system increases.

As stated before, the communication delay between the simulation and the RTPR is significant and the total WR communication delay is directly connected to the number of iterations. Therefore, the increment in the communication delay may offset the saved simulation time achieved by the time windowing technique unless the RTPR is equipped with a fast and therefore more expensive processor and communication tool. Secondly, the essential requirement of the time windowing technique is reinitializing the parameters of both simulation and hardware based on the converged results in previous windows. Therefore, if the hardware is not reinitializable, then this technique may be impractical.

The time windowing might be applied not as an acceleration technique but to extend the total simulation interval for a system if the hardware is reinitializable. One of the main limitations of the WR based HIL simulation is the RTPR memory to store the exchanged waveforms. Based on the size of the memory, a maximum simulation interval can be calculated with given simulation time step and number of signals input/output (I/O) channels. If a simulation interval larger than the calculated maximum interval is required and if and only if the hardware is reinitializable, then the time windowing technique can be applied to split the simulation time interval to several possible sizes.

In a simulation environment, initialization of a simulated model to any arbitrary values is usually allowed. However, it is rare in practice to find re-initializable hardware and it is a hard task to change the internal states of the hardware by changing the input signals. As a result, the traditional time windowing technique is generally applicable to the WR based HIL simulation only for cases where the HUT 112 does not have a memory, i.e. comprised of passive elements. A modified time windowing technique is provided to cope with this problem. Unlike the classical time windowing technique, the total simulation time is not divided into windows but the converged part of the waveform in every iteration of the WR remains fixed. Therefore, a time window with an initial size of zero, $T_W = 0$, is defined. At iteration k of WR, the waveform from the previous iteration is subtracted from the current iteration, the resulted waveform is called $W^k_{sub}$. A new time $T^k_W$ is found such that $W^k_{sub}$ has smaller values than a predefined threshold between $T^{k-1}_W$ and $T^k_W$ so that the part of the waveform in the time interval $[0\ T^k_W]$ remains fixed, equal to the $k^{th}$ iteration, during the rest of the WR process. $T^k_W$ is increased toward T, the total simulation time, and the simulation stops when $T^n_W = T$. This method introduces an increasing time window from t=0 to t=T and the converged part of the waveform is also repeated at every iteration. Therefore, there is no need to re-initialize the HUT at any $T^k_W$. This method can increase the robustness of the simulation against the hardware noise and inaccuracies such that if a noise enters to the converged part of the waveform, it is ignored and the noise does not affect the convergence of the simulation.

Generally speaking, the noise is usually considered as a parameter which reduces the accuracy of the results when a piece of hardware is involved in the simulations. In the WR based HIL simulation though the main issue is the divergence of the simulation caused by the noise which is much more critical than the simulation accuracy. The issue is not tolerable when the WR based HIL simulation diverges for a potentially stable simulation case, i.e. the cases that all the stability criteria are met so that the simulation would converge if the noise was absent.

As the convergence of the WR is progressive through a course of iterations, the main convergence criterion is that every subsystem, either simulation or hardware, must remain the same at every WR iteration. Firstly, every subsystem must be reinitialized or restarted to the same initial value that has been used in the previous iterations. Secondly, if a same waveform is applied "n" times as an input to a subsystem with same initial values, the "n" response waveforms of that subsystem must be equal. The latter implies that the subsystems' models and parameters must remain the same at every WR iteration. For instance, assume that the purpose of a WR simulation is to find the closed loop response of a controller hardware to a step change in a reference signal made in the simulation case. If the step change happens in time T1, in the first iteration, it must also happen in time T1 in all next iterations until the convergence is achieved.

At the initiation of every WR iteration the HUT is reset to an initial state to provide component configuration consistency between iterations. The initial state defines a desired operating state of the component and may be associated with one or more operational or configuration parameters provided to the component or associated with a reset function.

In order to reset the HUT at the beginning of every WR iteration, if the HUT is not reset enabled, then a specialized software reset technique can be used. Supposing that T seconds of simulation is of interest. Also, it is known that the HUT has a total transient time of $T_{trans}$, i.e. the time required for the HUT to settle down to a steady state value from any starting point, where obviously $T_{trans}<T$. The technique is to change the total simulation time to $T_{new}=T_{trans}+T$. Then, a same waveform in the interval [0 $T_{trans}$] is applied to the HUT at every iteration and the waveform in the interval [$T_{trans}$ $T_{new}$] is allowed to change through the WR iterations. The response of the HUT during the interval [0 $T_{trans}$] is ignored, e.g. set to zero. By using this technique, the HUT has a same initial value at $t=T_{trans}$ and therefore the convergence criterion is applied for the T seconds of the interval [$T_{trans}$ $T_{new}$].

The different converging techniques for the WR simulation described above can be combined to improve the speed and accuracy. In this example WRR 902, SOR 904, and TSA 906 are combined as shown in the block diagram presented in FIG. 9. From the selected acceleration techniques, the WRR is an independent acceleration technique that needs not consider whether if other techniques are applied. However, use of SOR and TSA at the same time for a case of simulation needs an interpolation stage when the time steps are switched from the large to the small. This is a requirement because the SOR technique needs to calculate the subtraction of the waveforms from a previous iteration and the current iteration whereas the size of the waveforms is increased at the time steps switching time.

Figure 9:
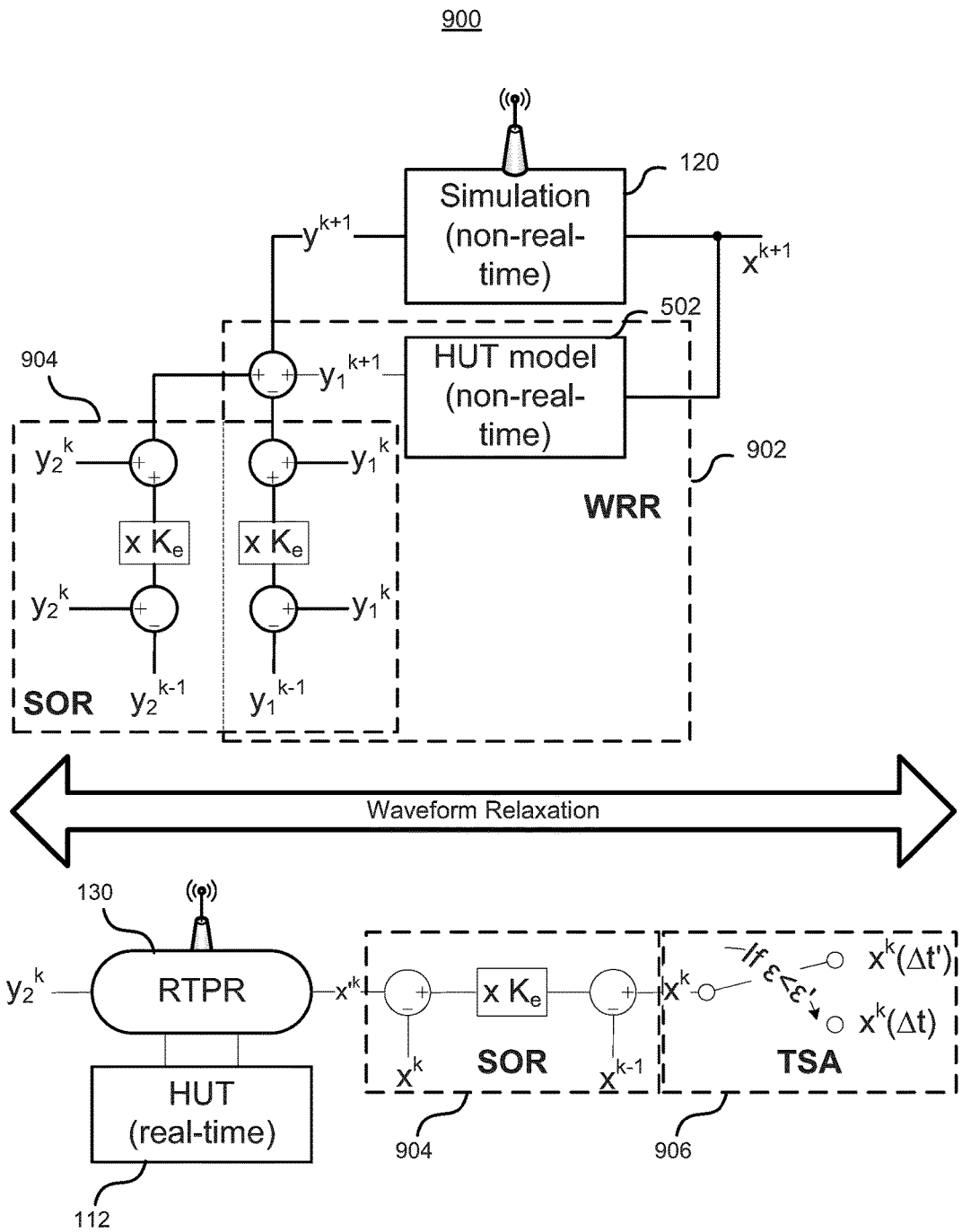
FIG. 9 shows a representation of combined WR converging methods.

The simulation begins with a sufficiently large RTPR time step ($\Delta t'$) until the WR converges within a sufficiently large tolerance ($\varepsilon'$). Then, the RTPR time step is changed to the nominal desired value ($\Delta t$) and the simulation continues until the desired convergence criterion, shown by $\varepsilon$ in FIG. 9, is satisfied. An "up-sampling" interpolation should be performed when the RTPR time step is changed so that the SOR can subtract two waveforms from two sequential iterations with the "same" sampling time. From FIG. 9, if the convergence conditions are met, the Simulation and HUT responses will converge to (12) and (13), respectively, in the last WR iteration.

$$\lim_{k\to\infty} y^{k+1} = \qquad (12)$$
$$\lim_{k\to\infty} \{y_1^{k+1} - (y_1^k + K_e(y_1^k - y_1^{k-1})) + y_2^k + K_e(y_2^k - y_2^{k-1})\} = y_2^k$$

$$\lim_{k\to\infty} x^k = \lim_{k\to\infty} \{x^k + K_e(x^k - x^{k-1})\} = x^k \qquad (13)$$

Among the known WR acceleration techniques for purely simulated subsystems, only a few are applicable to the WR based HIL simulation, especially when the communication delay between the non-real time simulator and the RTPR is significant. From experimental results the TSA technique improves the WR convergence speed but does not make the simulation robust against the noise and interface inaccuracies. On the other hand, the WRR technique improves not only the convergence speed significantly, but also the robustness of the simulation against the noise and interface inaccuracies. The combination of two techniques of WRR and SOR guarantees the convergence of the simulation even for the case where a weak approximation of the hardware was used for the WRR method. Then, in order to have the fastest convergence response, the TSA method can be added. Therefore, the combined solution of WRR, SOR, and TSA techniques can improve the amount of time and number of iterations required for WR convergence.

Figure 10:
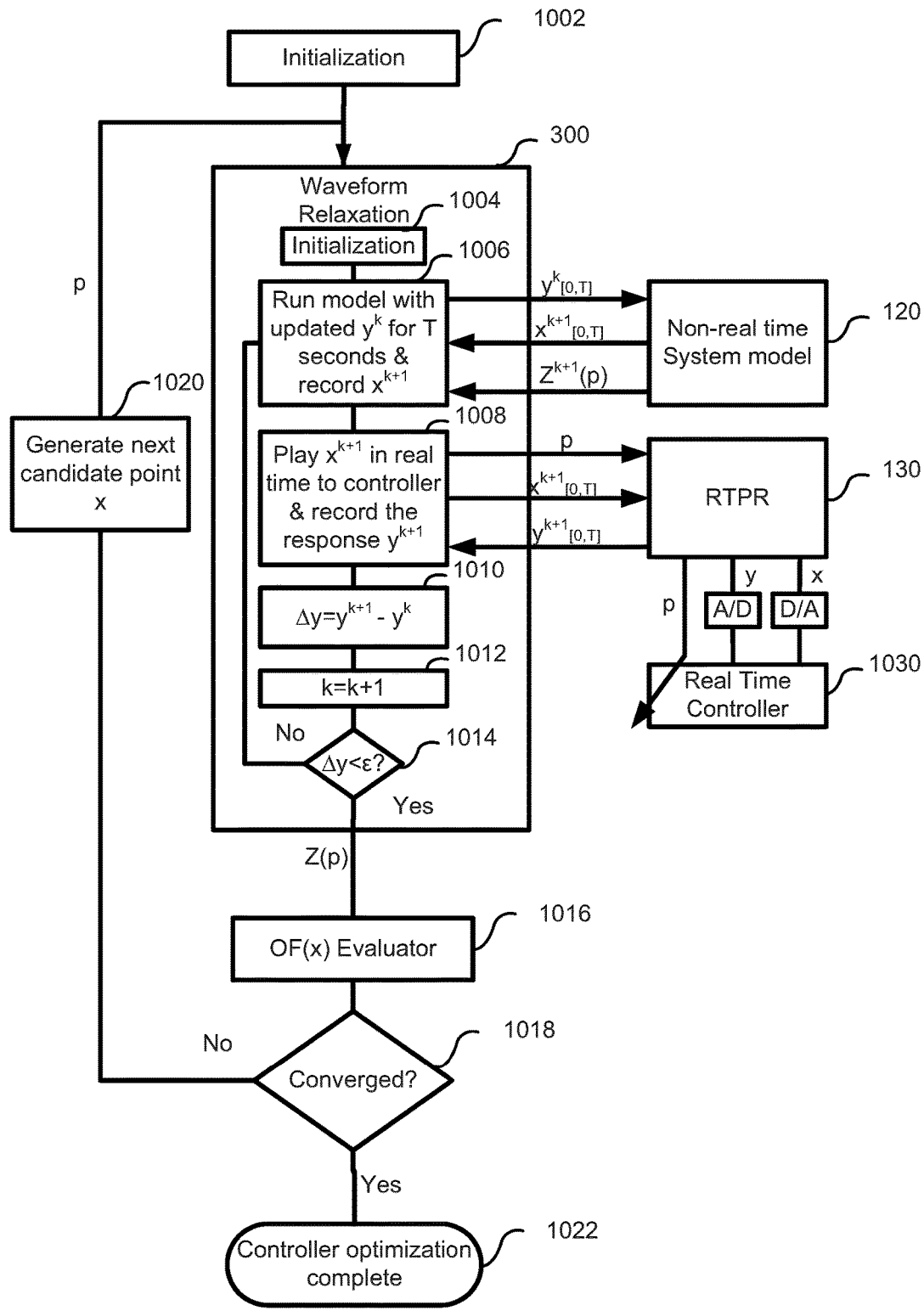
FIG. 10 shows a method of controller optimization.
Figure 11:
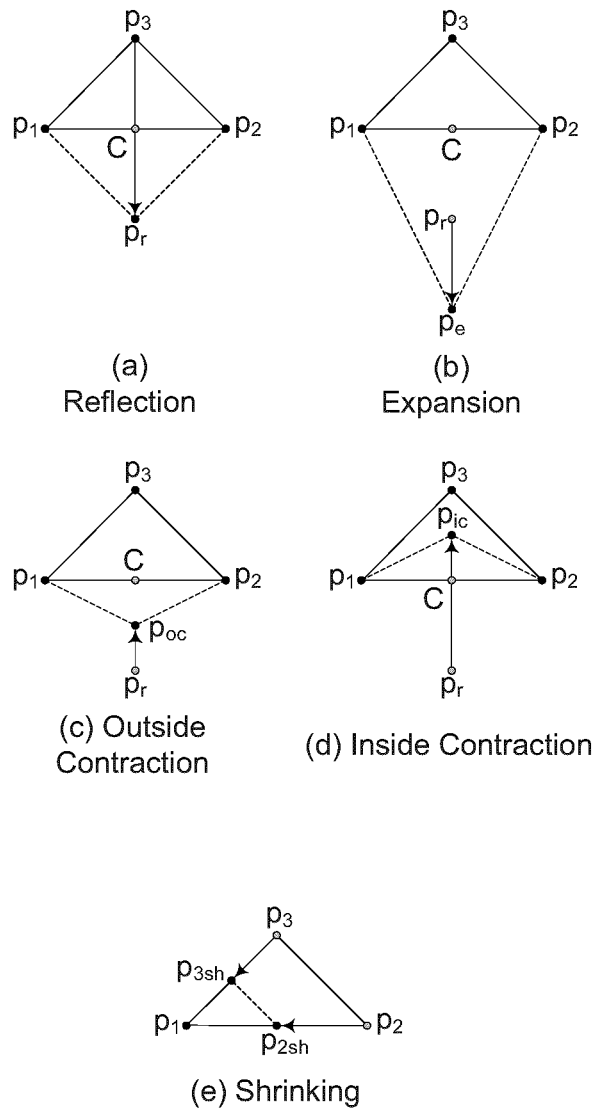
FIGS. 11 a-e show geometric operations used in Simplex optimization algorithm.

FIG. 10 shows a method of controller hardware-in-the-loop simulation optimization. Optimizing a controller based on the conceptual model of the controller is not reliable. The reason is that discrepancies can exist between the designed controller model in a computer program and the real implemented hardware controller. The filters employed in real controller's data input and output channels, noise, signals DC offsets, additional limits introduced by the permissible input and output voltage levels, as well as the ADC and DAC converters inaccuracies in actual controllers are such examples that can make the optimum point of the actual controller different than its computer model. On the other hand, controllers manufacturers usually do not disclose the detailed information about the models of their controllers and only the parameters that could be optimized are accessible.

The method 1000 for optimization of an actual controller 1030 within a simulation system 120 based on the WR method is presented in FIG. 10. The method is presented to optimize the parameters of one controller but is not limited to one. The parameters of multiple controllers can be optimized simultaneously with the method 1000. The WR based Controller-Hardware-in-the-Loop (CHIL) simulation (300) is applied in order to find the response of the actual controller 1030 in the loop with the simulation system 120 corresponding to every new candidate point, p, generated by the optimization algorithm (1020). Initialization (1002) consists of required information for running the optimization algorithm such as the initial candidate points (if required), stopping criteria, the OF definition, etc. The Objective Function (OF) corresponding to a candidate point is calculated (1016) using the resulted waveforms by WR method (300) from the system simulation 120. The process is iterated (NO at 1018) until the optimization algorithm generates new candidate points that result in the OF values with slight differences, called the OF tolerance, and can be said to have converged (YES at 1018) and the controller parameters optimization is complete (1022). The new candidate points, p, are passed to the controller via RTPR 130 if external tuning of the controller parameters is allowed; otherwise, the parameters are passed via any provided software by the manufacturer for this purpose.

The WR method 300 performs as an inner loop inside the optimization algorithm loop, therefore, the necessary condition to achieve a successful controller tuning is not only the convergence of the optimization algorithm (1020), but also the convergence of the WR method 300 at every optimization iteration. For each iteration of the method 300 the controller 1020 is initialized (1004). The non-real-time system model 120 is run with updated $y^k$ waveform for T seconds and $x^{k+1}$ waveform is recorded (1006). The $x^{k+1}$ waveform is played in real time to controller 102 and the response $y^{k+1}$ is recorded (1008). The difference between the $y^{k+1}$ and $y^k$ waveforms is determined (1010). The value of k is incremented (1012). If the difference between the waveforms meets the defined convergence criteria (YES at 1014) the closed loop response of the two subsystems is found for the candidate point p. The OF corresponding to a candidate point is calculated (1016) as described above. If the difference between the waveforms is greater than the convergence criteria (NO at 1014) the WR method continues (1006).

Nelder-Mead downhill Simplex is a popular nonlinear local search method for minimization of a given OF based on fundamental geometric considerations that can be used by the optimization algorithm (1020) and will be described below, however other linear or non-linear search methods such as a Genetic Algorithm may be utilized. Supposing N number of optimization parameters, the Simplex is defined as an N-dimensional geometric figure formed by N+1 points called vertices. Therefore, for N parameters to be optimized, a Simplex algorithm should be provided with N+1 initial points to begin. FIGS. 11a-e displays the geometric operations for a 2-dimensional Simplex with three vertices used in the Simplex optimization algorithm, where the centroid is denoted by "C" and pi (i=1, 2, 3) are the current iteration vertices such that, for a minimization problem, OF(p1)≤OF(p2)≤OF(p3) applies.

The optimization algorithm evaluates the OF values corresponding to the initial vertices and orders the N+1 points from the best (the point with smallest OF) to worst (the point with largest OF). The centroid (average) of N best points is calculated and the worst point is reflected through the centroid point, FIG. 11a. The OF regarding to the reflected point is evaluated. If the reflected point is worse than the best point and better than the second worst point, the worst point is replaced by the reflected point and the next iteration of the Simplex algorithm is started, FIG. 11b. If the reflected point is, however, better than the best point, first the reflected point is expanded through the centroid and evaluated. If the expanded point is better than the best point, the worst point is replaced by the expanded point; otherwise, the worst point is replaced by the reflected point and the next iteration is started. If the reflected point is worse than the second worst point but better than the worst point then the outside contraction through the centroid is performed and evaluated. If the contracted point is better than the reflected point then the worst point is replaced by the contracted point and the next iteration is started, FIG. 11c. However, if none of above conditions satisfied, it means that the reflected point is worse than the worst point. In this case, the inside contraction is performed and the contracted point replaces the worst point if better and the next iteration of the Simplex is started, FIG. 11d. As the last step, if the contracted point is worse than the worst point, then N worst points out of the total N+1 points are shrunk through the best point and the new N vertices are evaluated and the next iteration is started, FIG. 11e. This process continues on and stops once the OF values for all the vertices converge to an optimum value with a specified tolerance.

Figure 12:
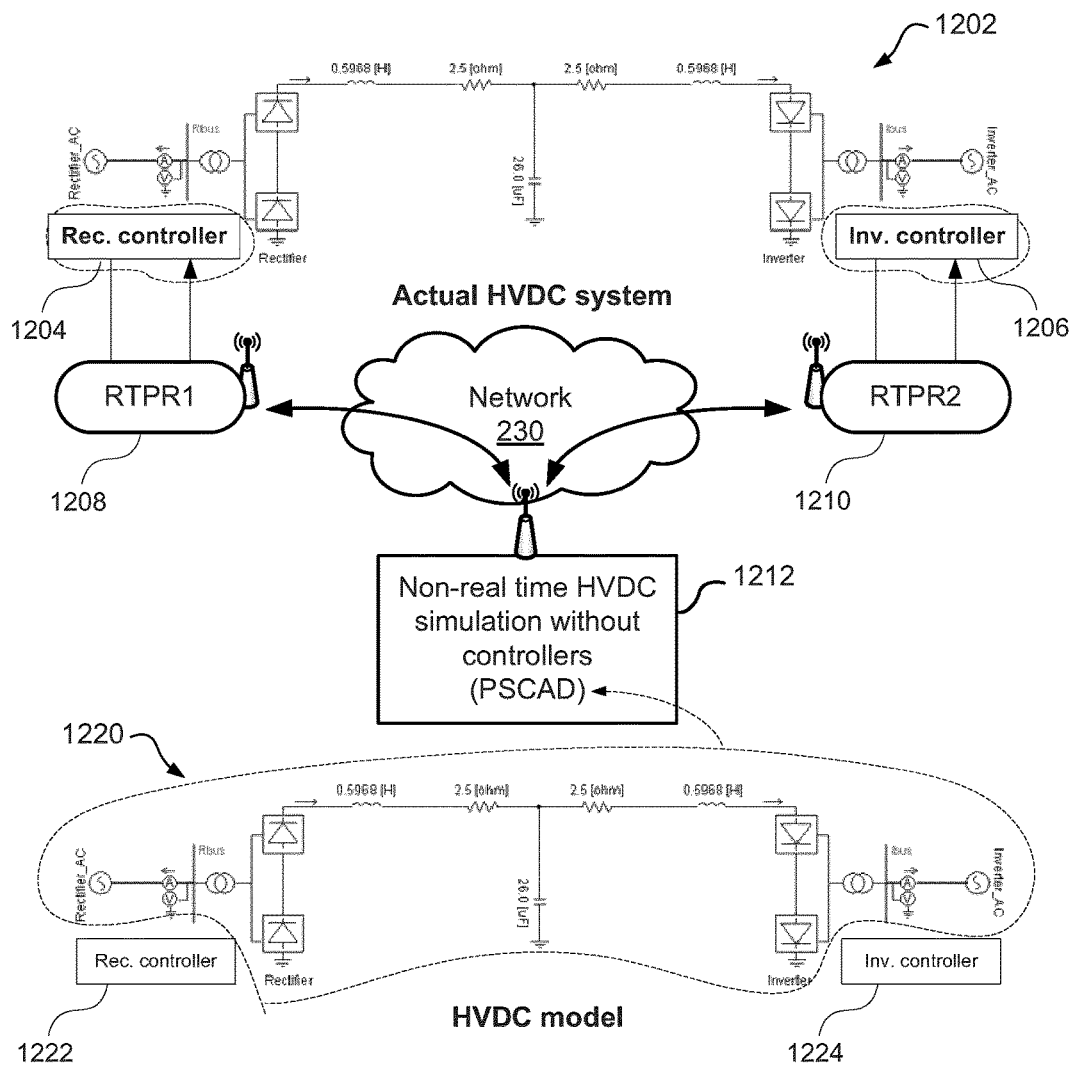
FIG. 12 shows a representation of WR based wide area real-time HVDC controllers in the loop simulation configuration.

FIG. 12 shows a representation of WR based wide area real-time high-voltage direct current (HVDC) controllers in the loop simulation configuration. An RTPR1 1208 and RTPR2 1210 are each connected to a respective controller 1204 and controller 1206 of the actual HVDC system 1202. The RTPR's are connected via internet 230 with different IPs to the computer equipped with the simulator 1212 providing the HVDC model. In this example four parameters possible to be optimized are the proportional gain (Krec) and integral time constant (Trec) of the rectifier's current controller, and proportional gain (Kinv) and integral time constant (Tinv) of the inverter extinction angle (y) controller. The parameters can be tuned by the Simplex optimization method such that the deviation between the measured DC current on the rectifier side and the current order is minimal. For this reason, the current order can be reduced from 1 pu to 0.78 pu and then increased to 1 pu as two step changes. The OF represented in (14) satisfies the mentioned requirement. The total simulation time utilized in this example is 0.7 seconds with similar simulation and RTPR time steps of 50 microseconds.

$$ISE(p) = \int_{0.3}^{0.7} \left(1 - \frac{I_{rec}}{I_{ref}(p)}\right)^2 dt \tag{14}$$

The combined acceleration technique is used to fast up the WR simulation. The initial RTPR time step was set to 250 microseconds and then changed to 50 microseconds for the TSA technique. On the other hand, the SOR constant is set to 0.9. Approximated rectifier and inverter controller models were applied to the WRR of the combined acceleration technique.

Because there are four optimization parameters, the Simplex is 4-dimensional formed by 5 vertices. In other words, five random initial points are given to the Simplex algorithm. Once a new optimization point is generated by the Simplex algorithm, the first two (Krec and Trec) is sent to the RTPR 1208 connected to the rectifier controller 1204 and the other two (Kinv and Tinv) are sent to the RTPR 1210 connected to the inverter controller 1206. First, the HVDC system is simulated in non-real-time with initial guesses as for both rectifier 1222 and inverter controllers 1224 and the signals to be sent to the controllers are recorded every 50 microseconds. Then, the rectifier's recorded input waveforms generated by the simulation are played in real-time to the rectifier controller by the RTPR 1208 and its response is recorded and sent back to the WR simulator. In the last step, the inverter's input waveforms are played in the real-time to the inverter controller by the RTPR 1210 and the response is captured and sent to the WR simulator to perform the next iteration of the WR. The WR simulator 1212 restores the converged DC current on the rectifier side obtained from non-real-time HVDC simulation in the last WR iteration. This waveform along with the current order signal are then passed to the OF calculator program to provide the Simplex optimization with the evaluated results for the particular optimization point. This process continues until the Simplex converges. The stopping criterion for the Simplex algorithm is set as a tolerance of 0.02 in the OF values. The Simplex converges in 40 iterations (the number of times that a new Simplex point is generated). The total optimization time is about 200 minutes.

From the obtained results, the effectiveness of the optimization algorithm of based on the WR algorithm is approved for the multiple remote controllers' optimization. Although the total optimization time for the method is always expected to be more than direct solutions due to the WR iterations as well as the communication time between the non-real-time simulator and the RTPRs, but this approach is practically the only solution to optimize multiple real-time controllers remotely, where each controller is allowed to be far from another. This method not only reduces the simulator cost, since non-real-time simulation of the power system is adequate, but also saves significant shipping time by allowing the controllers to remain at the same locations while being optimized. If the detailed models of the controllers are available, then the total optimization time can be significantly reduced by the aid of the WRR acceleration technique.

Figure 13:
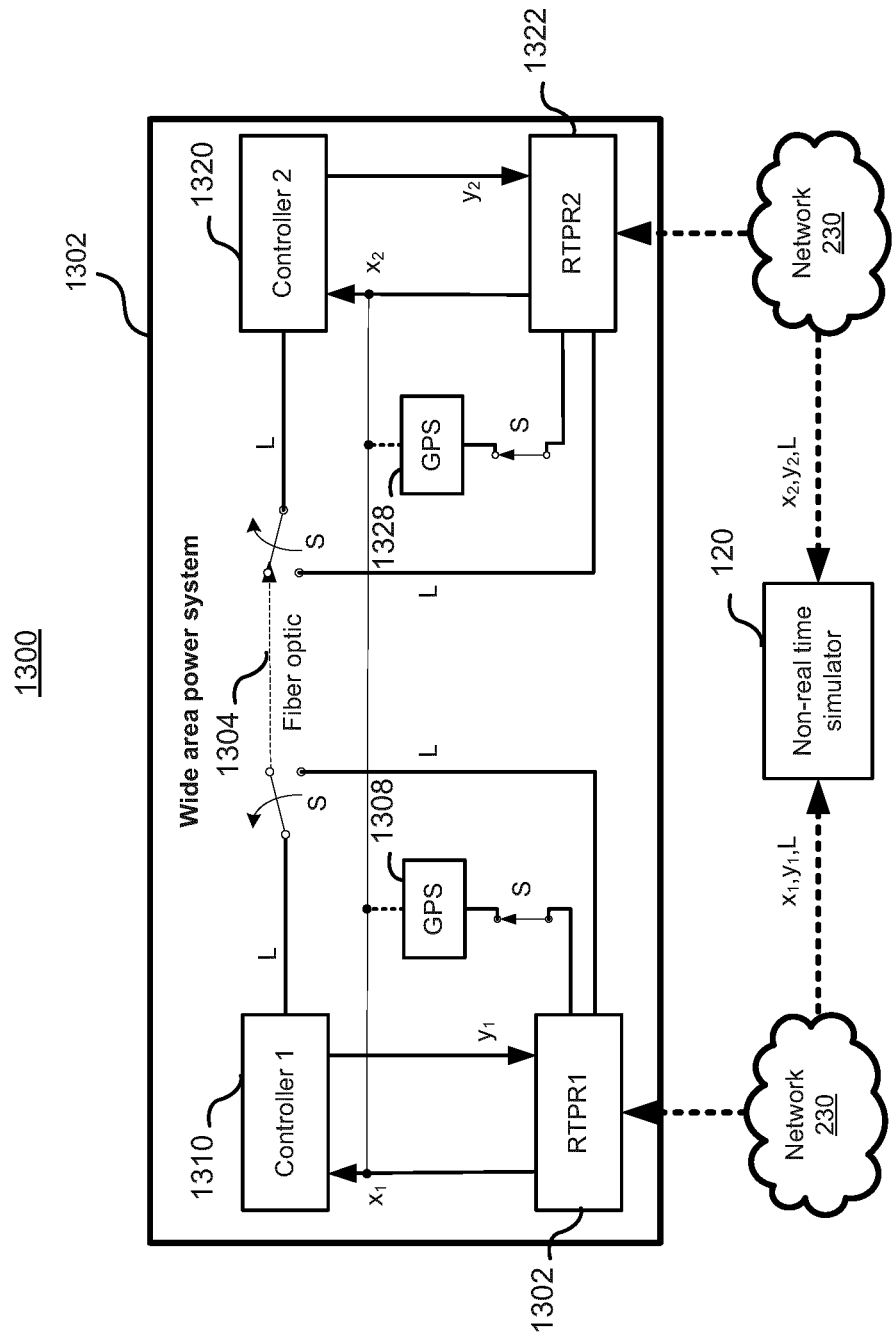
FIG. 13 shows a system representation of a closed loop test of wide area controllers with a communication link using GPS equipped WR based HIL simulation.
Figure 14:
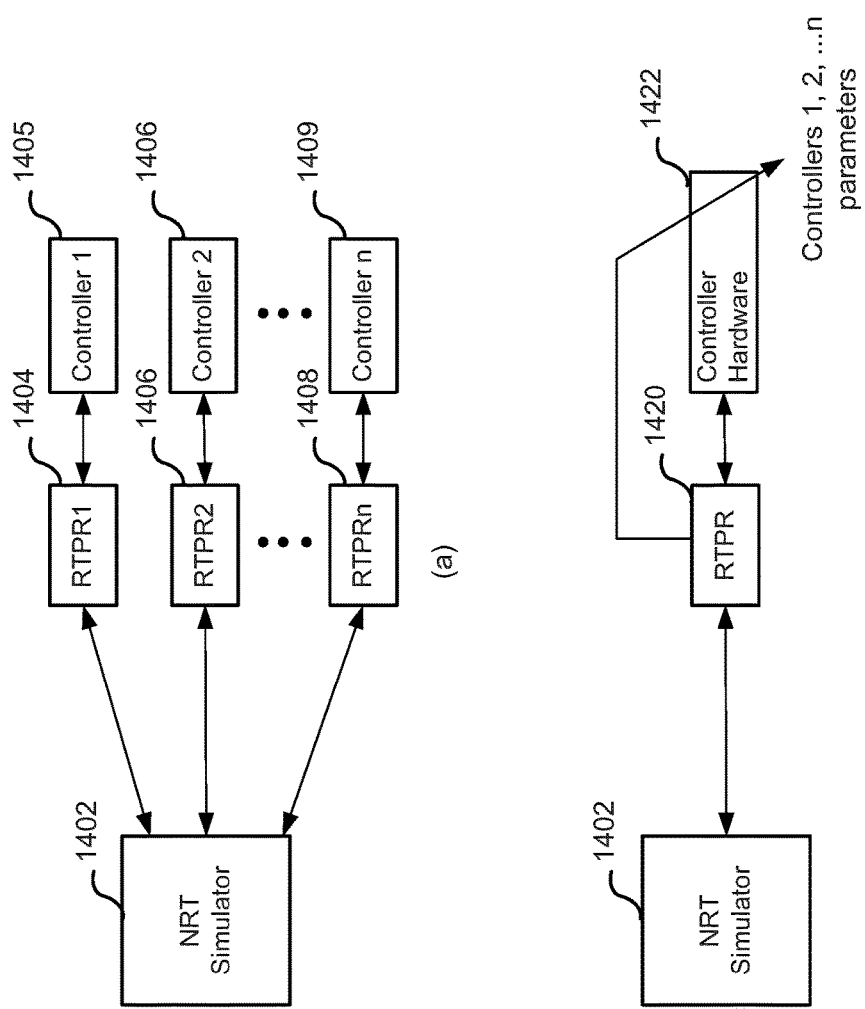
FIGS. 14a-b show a system for simplified test of multiple hardware.

FIG. 13 shows a representation 1300 of a closed loop test of wide area controllers with a communication link using global positioning system (GPS) equipped WR based HIL simulation. Controller) 1310 and controller2 1320 are connected via physical links such as fiber optics 1304, although other wired or wireless communication links may be utilized. Although wide area controllers 1310 1320 are geographically far from each other, but they are being operated in the same network 1302 and therefore their functions are related to each other so that, in some cases, some data must be communicated between the controller) 1310 and controller2 1320. Wide area measurement based control of power systems is such example where the Phasor Measurement Units (PMU), installed in different points of a wide area power system, send the time stamped (by using the Global Positioning System (GPS) technology) voltage and current values to a centralized controller. The controller then sends appropriate signals to multiple wide area controllers. The power system control is more robust with this technique because a controller's response depends on not only the local voltage and current values, but also those of other nodes in the power network.

In order to test and/or tune the wide area controller) 1310 and controller2 1320 which communicate signals via fiber optics 1304 or LAN simultaneously, both real-time controller) 1310 and controller2 1320 should be in the closed loop with the simulated model of the power system 120. In this example, any physical connection 1304 between the controller) 1310 and controller2 1320 is assumed to be disconnected and the communication signal is added to the WR signals. For example, the demanding current from the inverter controller 1310 to the rectifier controller 1320 is added as an output wave-form of the inverter controller 1310 captured by the RTPR1 1302 and as an input to the rectifier controller 1320 played in real-time by the RTPR2 1322 at every iteration of the WR method. In this scheme, there is no direct link between the controller) 1310 and controller2 1320 and therefore the communication link 1304 is not part of the test.

The waveforms $x_1$ and $x_2$ are the inputs of the controller) 1310 and controller2 1320, $y_1$ and $y_2$ are the output signals of the controllers, and L is the communication signal between the two controllers. If all the switches denoted by "S" are toggled, the fiber optic line is bypassed. WR methods described can be used to test the two controllers with adding the communication signal L to the WR signals, i.e. L is sampled by RTPR1 1302 and sent to the non-real-time simulator 120 and the simulator sends it to the RTPR2 1322 at the next iteration to be played to the controller2 1320. In this scheme, each controller) 1310 and controller2 1320 are considered as a decoupled subsystems. However, with the switches S positioned as FIG. 13, the signal L is directly communicated between the controller) 1310 and controller2 1320 and therefore the controllers' input signals must be played simultaneously by the two RTPRs. In other words, the two controllers 1310 1320 with the fiber optic link 1304 all together form a single wide area subsystem. Because the simulator 120 (for example PSCAD) communicates with the two RTPRs 1302 1322 connected to the controllers 1302 1322 via a network 230 such as the Internet, even if the waveforms are sent from the simulator at the same time, they may not be present to the controllers at the same time. In this case, the GPS unit 1308 and GPS unit 1328 can be used to synchronise the respective controller's input signals, $x_1$ and $x_2$.

It was previously described that the prerequisite for the WR based HIL simulation is that the subsystems parameters are similar in all the WR iterations-even if a parameter changes, it must change in all WR iterations similarly. The WR might still tolerate small inconsistent variations in the subsystem parameters. Noise can be categorized as such variations and it was shown that some acceleration techniques can increase the robustness of the WR simulation against the noise.

FIGS. 14*a-b* show a system for simplified test of multiple hardware. There are a number of examples where multiple hardware, such as controllers, with the same hardware structure and with the same or different parameters are installed in the system. One of the main reasons to conduct the real-time HIL simulation is the unknown discrepancies between the software models and the actually implemented hardware mainly due to the hardware platform such as ADCs, DACs, filters, data resolution, etc. For example, assume that, multiple controllers with the same hardware platforms (for example FPGA based controllers provided by a same company) but different parameter configurations components are to be tested before connecting to the actual system. Also suppose that the response of each controller is related to the response of other controllers and therefore all the controllers need to be tested or tuned simultaneously. The simplest, but not easiest, way is to wire all the controllers to the simulator (for the real-time digital simulation case) or to the RTPRs (for the WR based HIL case) and test each individual controller in the same loop.

FIG. 14*a* shows the traditional method of connection where each controller 1405, 1406, 1409 is connected to a respective RTPR 1404, 1406, 1408 and the simulator 1402 communicates with each controller as a separate subsystem. FIG. 14*b* displays a configuration where only one controller hardware 1422 is connected to one RTPR device 1420. The main requirement is that the hardware parameters are digitally tunable, i.e. the parameters can be electrically set by the RTPR 1420. Once the simulation results are available from the first iteration of the WR algorithm, the controller hardware parameters are tuned to the controller 1 1405 and the response is acquired and sent to the simulator. Then, the controller hardware parameters are changed to the controller 2 1406 and the response is captured. This is done for all "n" controllers parameters. After all the parameters set of each controller are uploaded to the controller hardware and each response is captured, the WR begins the second iteration. Therefore, the controller hardware 1422 presented in FIG. 13*b* is one piece of hardware but represents "n" distinct hardware subsystems. This simplification is only realizable with the WR based HIL technique because it is an iterative method and therefore the other subsystems are sleeping when one subsystem being played, however, all subsystems response must be available at every simulation time step when using the real-time digital simulator.

Figure 15:
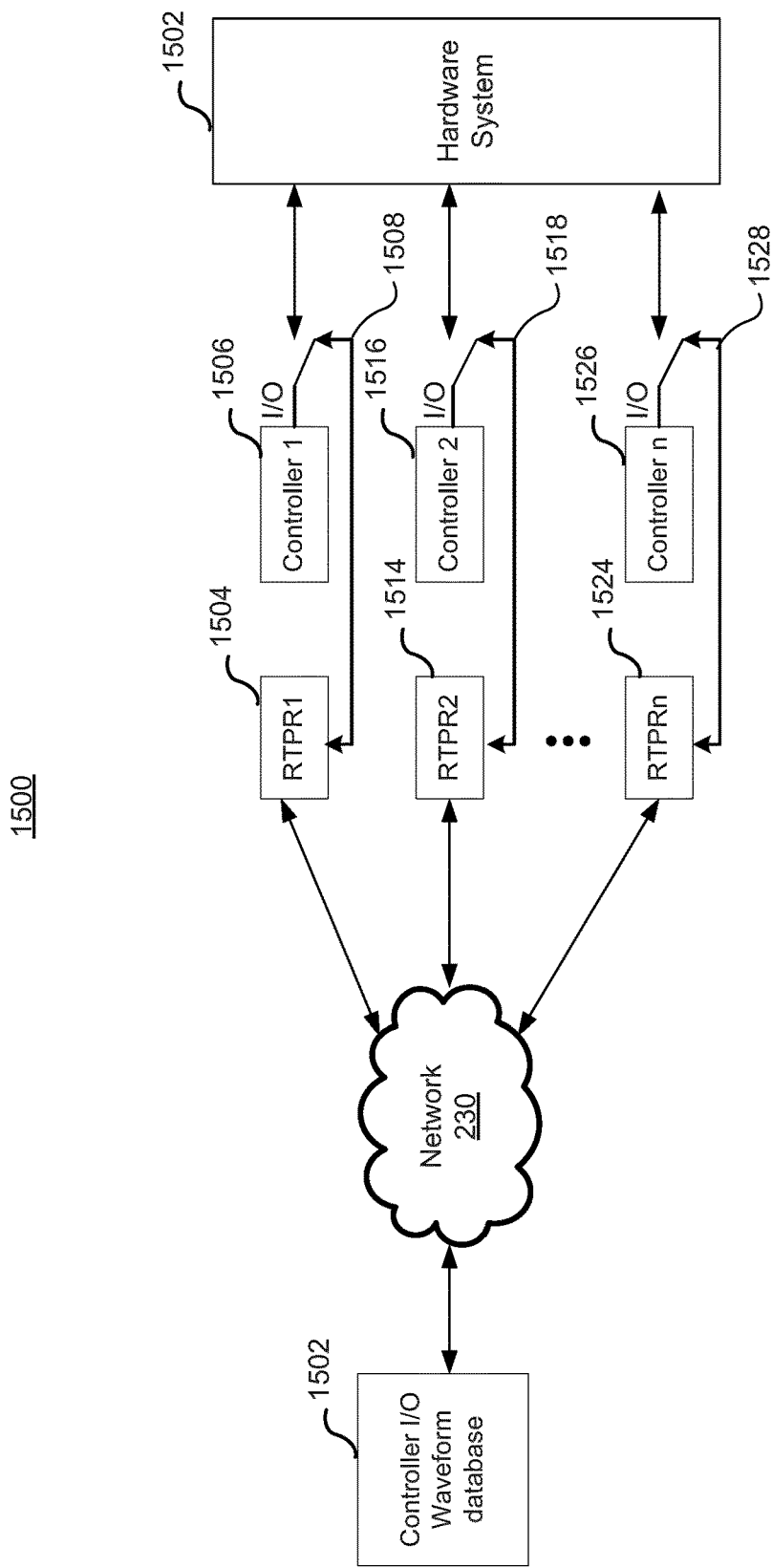
FIG. 15 shows a representation of using real-time player and recorders (RTPRs) for fast detection of faulty controller hardware.

FIG. 15 shows a configuration using real-time player and recorders (RTPRs) for fast detection of faulty controller hardware. The RTPR device may be utilized as a tool to discover faulty controllers. The operation of a controller against a particular physical system condition is characterized using the RTPR before the controller is installed in the system and the associated waveforms from the controller can be stored in a waveforms database. When a fault is detected, the controllers are switched to RTPRs and receive the stored input waveforms from the database and the response waveforms are compared against baseline waveforms to identify the controller or controllers not operating according to specifications.

Using an HVDC scenario, assume that there are "n" controllers being operated in a section of the power system (either local or wide area). Besides the faults occurring in for example transmission and distribution lines, a failure in the performance of a controller can also cause a fault in the system. In this situation, it is important to detect which controller among many installed controllers has malfunctioned. Assuming that the section of the power system is isolated due to the fault, or backup controllers are switched on, testing each disconnected controller sequentially is time consuming and testing the controllers all at the same time by using the real-time digital simulators is expensive.

Suppose that all the input and output signals of the actual "n" controllers in FIG. 15 resulted from the real-time closed loop simulation of the controllers within the model of the power system (either by using the real-time digital simulator or the WR based HIL technique) are recorded for a time window of T seconds. The switches 1508, 1518, 1528 positioned as shown in FIG. 15 shows that the respective controllers 1506, 1516, 1526 are disconnected from the physical system 1502 and connected to "n" RTPRs 1504, 1514, 1524 respective after the internal fault occurs in one or more of the controllers. Each RTPR 1504, 1514, 1524 is equipped with networking capability with a predefined local or public IP address, which is also stored in the controllers I/O waveforms database 1502 shown in FIG. 15. Each controller's input signal, $x_i$, is sent to the RTPR 1504, 1514, 1524, which is connected to the corresponding controller 1506, 1516, 1526. The RTPRs 1504, 1514, 1524 playback the received waveforms in real-time and capture the response waveforms of the respective controllers 1506, 1516, 1526, $y_i$. The controllers 1506, 1516, 1526 response waveforms are then sent back to the database to be compared with the expected waveforms (generated from the HIL simulation a priori). The controllers whose post-fault response waveforms are different from the pre-fault waveforms are finally detected.

Figure 16:
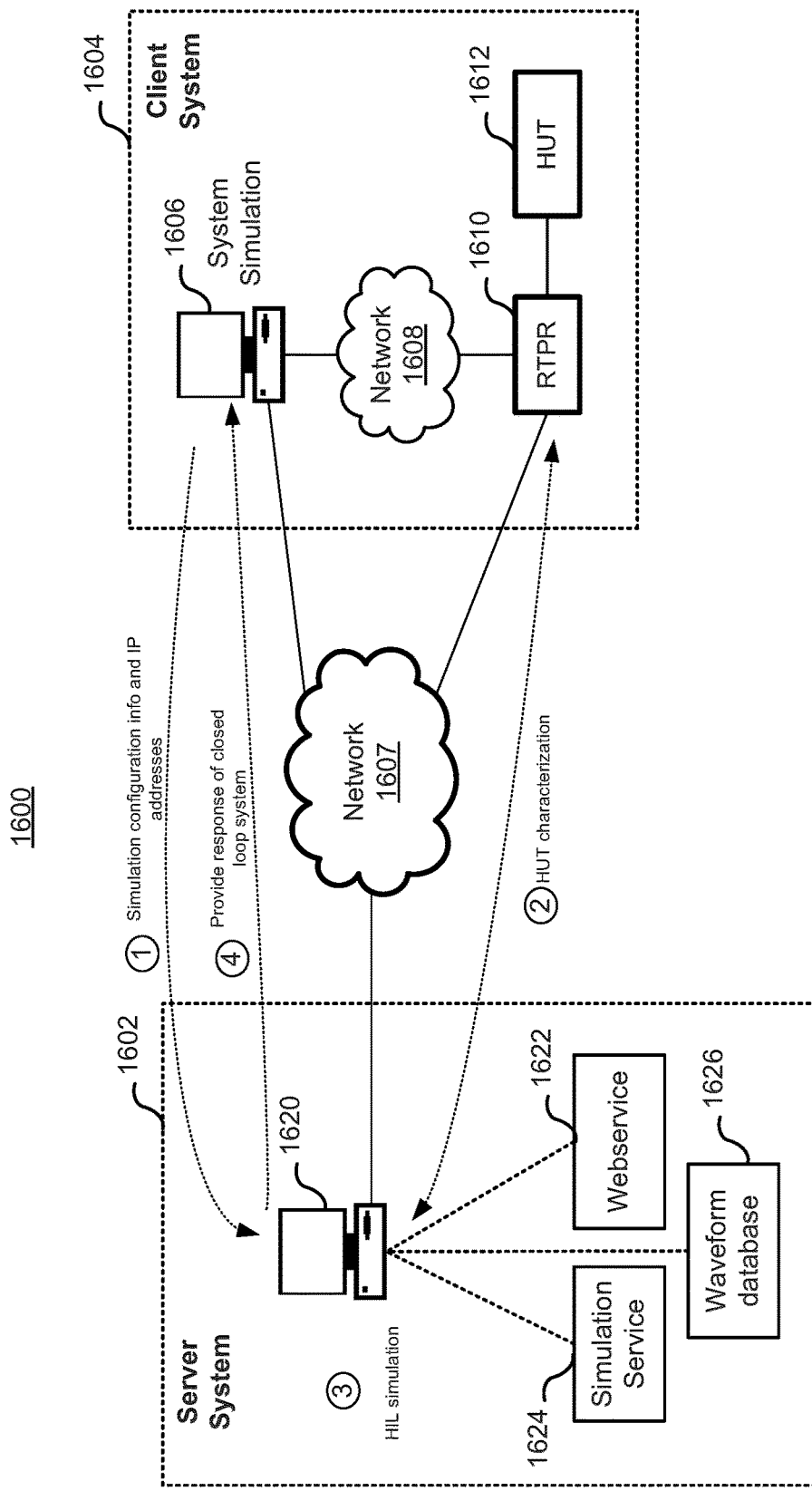
FIG. 16 shows a system for cloud based HIL simulation.

FIG. 16 provides cloud-based HIL simulation system. In this example a cloud based system is provided for providing closed-loop simulation of a computer model of a physical system and an actual real-time hardware component of the physical system. A client system 1604 comprises a system simulation client computer 1606 which may be executed by a computer, having at least a processor, memory and network interface, such as a personal computer. The client system 1604 also comprises an RTPR 1604 connected to the hardware-under-test 1612. The RTPR 1610 may be coupled to a system simulation client computer 1606 by internal network 1608 or accessible by a connection to the Internet 1607. A user of the system simulation client computer 1606 signs in to a web application provided by a server 1620 providing a web service 1622 of the server system 1602. The server 1620 is provided by one or more processors associated with at least a memory and network interface. The server system 1602 is accessible by the Internet 1607. The user provides both the IP address of the computer hosting the system simulation client computer 1606 which includes a simulation case and the IP address of the RTPR 1610. The simulation service 1624 provided by the server 1620 performs the HIL simulation between these two (or more) subsystems by communicating with the RTPR 1610. The server 1620 may communicate directly with the RTPR 1610 or may utilize the system simulation client computer 1606 to communicate with the RTPR 1610. The server 1620 then provides the response of the closed loop system containing their simulation and actual hardware to the system simulation client computer 1606. The simulation service 1624 may also provide additional features such as but not limited to optimization, faulty controller detection, and tuning the controllers models to be as similar as an actual controller. The server 1620 may be coupled to a waveform or model database 1626 for providing characterization of hardware components.

All of the disclosure, regardless of the particular implementation described, is exemplary in nature, rather than limiting. The system may include more, fewer, or different components than illustrated in FIGS. 1 to 16. Furthermore, each one of the components of system may include more, fewer, or different elements than is illustrated in FIGS. 1 to 16. Software, instructions, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a communications network. In yet other embodiments, the logic or instructions may be stored within a given computer such as, for example, a CPU.

While various embodiments of the system and method for distributed software updates have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A method of closed loop simulation of a computer model of a physical system and an actual real-time hardware component of the physical system, the method comprising:

generating at a simulation processor an input waveform for the actual real-time hardware component from a simulated model of the physical system using an initial waveform as a response waveform of the actual real-time hardware component;

sending from the simulation processor through a network to a real-time playback and record device (RTPR) connected to the actual real-time hardware component the input waveform, the RTPR resetting the actual real-time hardware component to an initial state and playing back the generated input waveform in real-time to the actual real-time hardware component, the RTPR receiving a real-time response waveform generated from the actual real-time hardware component;

receiving at the simulation processor from the RTPR through the network the generated response waveform of the actual real-time hardware component;

using one or more waveform relaxation (WR) converging methods at the simulation processor to enable convergence of the generated waveforms from the actual real-time hardware affected by hardware induced distortions;

performing a WR method with the generated waveforms from the actual real-time hardware to provide a closed loop simulation response;

wherein a modified time windowing technique is applied to converged parts of the received actual hardware's response waveforms, where new waveforms' samples of a current iteration are compared to those from a previous iteration to determine if a larger portion of the waveforms have converged by comparing a difference between samples with a predefined small threshold constant where the samples refer to the recorded waveforms magnitudes generated by the real-time actual hardware at all sampling times within the simulation interval of [0, T], where T is the simulation end time; and wherein a convergence window (CW) size, where CW=0 at first iteration and CW=T at convergence, is increased to include an interval of a converged part of the waveform and previously converged parts of the waveforms that were recorded, and the waveforms of the current iteration are reconstructed by only allowing non-converged parts (for t>CW) and replacing the recorded waveforms' samples in converged parts (t≤CW) by recorded converged waveforms' samples to prevent appearance of noise and hardware distortions in already converged waveforms' samples.

2. The method of claim 1 wherein the actual real-time hardware component is selected from: a power hardware component, a controller component, and an electro-mechanical component.

3. The method of claim 1 wherein the WR method is Gauss-Seidel Waveform Relaxation (GS-WR) method, Gauss-Jacobi Waveform Relaxation (GJ) method, a modified GS-WR method, or a modified GJ method.

4. The method of claim 1 wherein the physical system model simulator is a real-time simulator or a regular (non-real-time) simulator.

5. The method of claim 1 wherein the simulation of the physical system is partitioned into multiple simulated subsystems; and wherein each actual real-time hardware component of the physical system to be simulated has an associated RTPR.

6. The method of claim 1 wherein the one or more WR converging methods is accelerated by an acceleration technique.

7. The method of claim 1 wherein the one or more WR converging methods is WR reinforcement (WRR) technique at the actual real-time hardware component's output side, wherein an approximated model of the actual real-time hardware component is added to the closed loop simulation and an output waveform response of the approximated model of the actual real-time hardware component from a previous iteration is subtracted from an output waveform in a current iteration and the resultant is added to actual real-time hardware component output response waveform from the last iteration and injected to the input of the closed loop simulation.

8. The method of claim 7 wherein the actual real-time hardware component is a power hardware, wherein the one or more WR converging methods is WR stabilization technique, wherein the approximated model of the actual real-time hardware component is replaced by a resistor.

9. The method of claim 1 wherein the one or more WR converging methods is WR reinforcement (WRR) technique at the actual real-time hardware component's input side, wherein an additional simulated system including an approximated model of the actual real-time hardware component is created and the output waveform of the simulated system with the approximated model from a previous iteration is subtracted from an output waveform response in a current iteration and a result is added to the output waveform response of the simulated system without the approximated model of the actual real-time hardware component from a previous iteration and injected to an input of the approximated model of the actual real-time hardware component in a current iteration and then to an input of the actual real-time hardware component through the RTPR and a response waveform of the actual real-time hardware component is injected to the simulated system without the approximated model of the actual real-time hardware component to accomplish a current iteration.

10. The method of claim 9 wherein the hardware component is a power hardware, wherein the one or more WR converging methods is WR stabilization technique, and wherein the approximated model of the real-time hardware is replaced by a resistor.

11. The method of claim 1 further comprising averaging of input or output waveform of the actual real-time hardware component from a last N consecutive WR iterations of the WR converging methods to eliminate an effect of hardware distortions on the convergence of the WR converging methods, wherein a current iteration waveform is replaced with a weighted summation of an average waveform and a last iteration waveform, wherein weighting coefficients are calculated based on a convergence history waveform N and a distance waveform d.

12. The method of claim 1 wherein the actual real-time hardware component is controller hardware, the method further comprising performing optimization by a linear or non-linear search method to generate a next candidate point for the WR method, the next candidate point is applied to the controller hardware, and then the WR method is performed for the next candidate point.

13. A system for performing closed loop simulation, the system comprising:

a real-time playback and recording (RTPR) device coupled to a hardware component and a communication network, the RTPR for playing back input waveforms in real-time for the hardware component, the RTPR receiving real-time response waveforms generated from the hardware component;

a system simulation client computer coupled to a communication network, the system simulation client computer having a simulator program to simulate a computer model of a physical system, the system simulation client computer playing back input waveforms to the model of the physical system, and recording the response of the simulation of the model of the physical system; and a server computer coupled to the communication networks for communicating with the RTPR and the system simulation client computer, the server computer equipped with one or more waveform relaxation (WR) converging methods and a WR method, the server computer configured to:

receive a simulation configuration from the system simulation client computer having internet protocol (IP) addresses associated with the RTPR and the system simulation client computer;

perform closed loop simulation of the hardware component coupled to the RTPR and the model of the physical system simulated in the system simulation client computer by exchanging the waveforms by communicating with the RTPR and the system simulation client computer via the associated IP addresses; and provide a response of the closed loop simulation to the system simulation client computer via the associated IP address;

wherein a modified time windowing technique is applied to converged parts of the received actual hardware's response waveforms, where new waveforms' samples of a current iteration are compared to those from a previous iteration to determine if a larger portion of the waveforms have converged by comparing a difference between samples with a predefined small threshold constant where the samples refer to the recorded waveforms magnitudes generated by the real-time actual hardware at all sampling times within the simulation interval of [0, T], where T is the simulation end time; and wherein a convergence window (CW) size, where CW=0 at first iteration and CW=T at convergence, is increased to include an interval of a converged part of the waveform and previously converged parts of the waveforms that were recorded, and the waveforms of the current iteration are reconstructed by only allowing non-converged parts (for t>CW) and replacing the recorded waveforms' samples in converged parts (t≤CW) by recorded converged waveforms' samples to prevent appearance of noise and hardware distortions in already converged waveforms' samples.

14. The system of claim 13 wherein the hardware component is selected from: a power hardware component, a controller component, and an electro-mechanical component.

15. The system of claim 13 wherein the WR method is Gauss-Seidel Waveform Relaxation (GS-WR) method, Gauss-Jacobi Waveform Relaxation (GJ) method, a modified GS-WR method, or a modified GJ method.

16. The system of claim 13 wherein the simulation of the physical system is partitioned into multiple simulated subsystems wherein each component of the physical system to be simulated has an associated RTPR.

17. The system of claim 13 wherein the one or more WR converging methods is WR reinforcement (WRR) technique at the real-time hardware component's output side, wherein an approximated model of the real-time hardware component is added to the simulated system and an output waveform response of the approximated model of the real-time hardware component from a previous iteration is subtracted from an output waveform in a current iteration and the resultant is added to the real-time hardware component output response waveform from the last iteration and injected to the input of the simulated system.

18. The system of claim 13 wherein the one or more WR converging methods is WR reinforcement (WRR) technique at the real-time hardware component's input side, wherein an additional simulated system including an approximated model of the real-time hardware is created and the output waveform of the simulated system with the approximated model from a previous iteration is subtracted from an output waveform response in a current iteration and a result is added to the output waveform response of the simulated system without the approximated model of the real-time hardware component from a previous iteration and injected to an input of the approximated model of the real-time hardware component in a current iteration and then to an input of the real-time hardware component through the RTPR and a response waveform of the real-time hardware component is injected to the simulated system without the approximated model of the real-time hardware component to accomplish a current iteration.

19. A non-transitory computer readable memory for performing closed loop simulation of a computer model of a physical system and an actual real-time hardware component of the physical system, the memory containing instructions which when executed by a processor perform:

generating at a simulation processor an input waveform for the real-time hardware component from a simulated model of the physical system using an initial waveform as a response waveform of the component;

sending from the simulation processor through a network to a real-time playback and record device (RTPR) connected to the real-time hardware component the generated input waveform, the RTPR resetting the real-time hardware component to an initial state and playing back the generated input waveform in real-time to the real-time hardware component, the RTPR receiving a real-time response waveform generated from the real-time hardware component;

receiving at the simulation processor from the RTPR through the network the generated response waveform of the real-time hardware component;

using one or more waveform relaxation (WR) converging methods at the simulation processor to enable convergence of the generated waveforms from the real-time hardware affected by hardware induced distortions;

performing a WR method with the generated waveforms from the actual real-time hardware to provide a closed loop simulation response;

wherein a modified time windowing technique is applied to converged parts of the received actual hardware's response waveforms, where new waveforms' samples of a current iteration are compared to those from a previous iteration to determine if a larger portion of the waveforms have converged by comparing a difference between samples with a predefined small threshold constant where the samples refer to the recorded waveforms magnitudes generated by the real-time actual hardware at all sampling times within the simulation interval of [0, T], where T is the simulation end time; and wherein a convergence window (CW) size, where CW=0 at first iteration and CW=T at convergence, is increased to include an interval of a converged part of the waveform and previously converged parts of the waveforms that were recorded, and the waveforms of the current iteration are reconstructed by only allowing non-converged parts (for t>CW) and replacing the recorded waveforms' samples in converged parts (t≤CW) by recorded converged waveforms' samples to prevent appearance of noise and hardware distortions in already converged waveforms' samples.

* * * * *